United States Patent
Voce et al.

(10) Patent No.: US 6,389,289 B1
(45) Date of Patent: May 14, 2002

(54) EARTH TILING SYSTEM FOR PROVIDING REGIONAL BASED SERVICE IN A MOBILE SATELLITE COMMUNICATION NETWORK

(75) Inventors: Daniel A. Voce, Germantown; Matthew Mohebbi, Potomac; Asha Mehrotra; John Fry, both of Gaithersburg, all of MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/290,487

(22) Filed: Apr. 12, 1999

Related U.S. Application Data
(60) Provisional application No. 60/084,633, filed on May 7, 1998.

(51) Int. Cl.[7] .................................................. H04Q 7/38
(52) U.S. Cl. ...................... 455/456; 455/429; 455/446
(58) Field of Search .................................. 455/427, 428, 455/429, 430, 431, 446, 448, 12.1, 13.1, 13.2, 13.3, 517, 456.7; 345/428; 283/34, 35; 434/150

(56) References Cited

U.S. PATENT DOCUMENTS

| | | | |
|---|---|---|---|
| 5,408,237 A | * 4/1995 | Patterson et al. | 455/12.1 X |
| 5,781,195 A | * 7/1998 | Marvin | 345/428 |
| 5,946,618 A | * 8/1999 | Agre et al. | 455/428 |
| 6,021,309 A | * 2/2000 | Sherman et al. | 455/12.1 |

OTHER PUBLICATIONS

"Mercator Projection",Brittanica.com Online, Internet Address <http://www,britannica.com/eb/article?eu=53382&tocid=0>, Accessed Jun. 10, 2001, p. 1.*

"Globe of the Earth With No Land Distortion And (Right) The Mercator Projection . . . " (Graphic), Britannica.com Online, Internet Address <http://www.britannica.com/eb/art?id=12935&type=A>, Accessed Jun. 10, 2001, p. 1.*

\* cited by examiner

*Primary Examiner*—William Trost
*Assistant Examiner*—Philip J. Sobutka
(74) *Attorney, Agent, or Firm*—John T. Whelan; Michael W. Sales

(57) ABSTRACT

A method and apparatus for determining the proper satellite communications service to be provided to a subscriber unit that may be integrated with the geographically defined service areas used in terrestrial cellular communications systems. The pre-existing geographically defined service areas are subdivided into quadrilateral tiles wherein each tile corresponds to a single service area. In addition, the tiles are mapped to a grid having a plurality of regularly spaced grid locations. A lookup table is created that references each grid location to the tiles that overlap the grid locations. The position of the subscriber unit and an approximated region of error within which the subscriber unit is likely to be located are used as input. The approximated region of error is mapped to the grid to identify the grid locations that align with the approximated region of error. Thereafter, the lookup table is accessed to identify the tiles associated with the aligning grid locations and the identified tiles are then used to identify the service area in which the subscriber unit is located so that the proper communications service may be provided. If necessary, geometrical point in polygon inclusion methods and ellipse and polygon intersection methods are used to more accurately identify the tiles of interest.

1 Claim, 15 Drawing Sheets

| lon | n | n+1 | n+2 | n+3 |
|---|---|---|---|---|
| lat m | | | | |
| m+1 | list 2 | | | |
| m+2 | list 3 | | | |
| m+3 | list 4 | | | |

EARTH TILING SYSTEM FOR PROVIDING REGIONAL BASED SERVICE IN A MOBILE SATELLITE COMMUNICATION NETWORK

RELATED APPLICATIONS

This application is based on and claims benefit from provisional application entitled "Earth Tiling System for Providing Regional based Services in a Mobile Satellite Communications Network" which was filed on May 7, 1998, and respectively accorded Serial No. 60/084,633.

BACKGROUND OF THE INVENTION (a) Field of the Invention

This invention relates generally to mobile satellite communications systems and, more particularly, to a service area modeling system that supports geographically defined satellite communications service and a method of using the modeling system for rapid identification of the service area in which a mobile user is located.

(b) Description of Related Art

In terrestrial cellular communications systems, a service area is defined as a geographical region within which a communications service provider has made available particular mobile calling services and charges particular billing rates. All mobile callers located within a given service area are treated equally in terms of billing rates (according to subscription) and available services, so it is necessary to determine the service area within which a mobile caller is located in order to be able to properly process a call initiated by the caller.

In the terrestrial cellular communications environment, each stationary cellular tower provides communication services to a geographic region referred to as a cell which is typically about one or two kilometers in diameter and each tower transmits calls at a range of frequencies allocated exclusively to the tower. In addition, each tower is exclusively associated with the service area in which the tower is geographically located such that each tower provides services to the cell in accordance with the service area in which the tower is located. Because each tower transmits at a unique range of frequencies, the transmission frequency of a call may be used to identify the tower that is transmitting the call and, due to the one-to-one correspondence between towers and service areas, once the tower transmitting the call has been identified, the service area is also known. Thereafter, an identifier ("ID") corresponding to the identified service area is transmitted to a switch that connects the cellular communications network to the public switched telephone network. The switch is programmed to provide the services and billing rates defined for that service area ID so that the call may be properly processed.

This system of call processing in which the call transmission frequency is used to identify the transmitting tower which is then used to identify the service area in which the user is located so that the call may processed accordingly works well in the terrestrial cellular communications environment, in part, because the towers are stationary and the cells (transmitting ranges of towers) are relatively small in size. However, this same call processing system is not suited for the satellite communications environment. In particular, in the satellite environment, the counterpart to the stationary towers of the cellular environment include satellite mounted spotbeam antennas. These spotbeam antennas project ago spotbeams onto the earth and provide communication service to all system users located within the area onto which the spotbeam projects. Thus, the spotbeam may be considered, in some ways, the satellite environment equivalent to the cell of the cellular environment. However, spotbeams project onto geographic regions that are typically on the order of hundreds of kilometers, and, therefore, may encompass a plurality of service areas. As a result, there is not a one-to-one correspondence between spotbeams and service areas. Therefore, in the satellite environment, knowing the identity of the satellite spotbeam transmitting the communications service, e.g., the call, does not enable the identification of a single service area in the cellular environment. In addition, in a non-geo stationary satellite system, low to medium earth orbit satellites are orbiting the earth at rapid speeds so that the spotbeams projected onto the earth's surface by the satellite are also in motion. Thus, the geographic region onto which a satellite cell is projected is changing as the satellite moves, thereby making it impossible to correlate a spotbeam with a single geographically defined service area.

Further, although some satellite systems are equipped to approximate the location of a subscriber unit, the approximation is typically subject to error. This error may span a geographical region that overlaps several service areas and thus is not useful in pinpointing the service area in which the mobile caller is located. In addition, service areas typically have complex geometric shapes as they are often configured to coincide with national or other geopolitical borders so that this error is even less tolerable when the caller is located near an intricate border.

In systems in which the longitudinal and latitudinal coordinates of the subscriber unit can be determined with a satisfactory degree of accuracy, the system could potentially determine the service area of the subscriber unit by identifying the service area corresponding to the coordinate position of the mobile subscriber. However, such a method would require a table in which each of the infinite number of coordinate points on the surface of the earth are associated with a service area. Such an infinitely long list cannot be compiled and would, at any rate, be inefficient and time consuming to search.

Another difficulty is encountered when attempting to model service areas in the satellite communications environment. In particular, geographically defined service areas modeled on the surface of the earth in the satellite environment are three dimensional due to the quasi-spherical shape of the earth. As a result, complex and time consuming three dimensional geometry is required to determine the location of the caller relative to the three dimensional service areas.

Although geographically defined service areas are not an inherent property of mobile satellite communications systems, they are well established in the terrestrial cellular communications system. As a result, existing terrestrial architecture includes equipment adapted to process calls using the geographically defined service areas. In particular, once the service area has been identified for an on-going mobile telephone call, an ID corresponding to the identified service area is transmitted to a mobile switching center. In response, the switch, which has been programmed with the services and billing rates to be provided for the service area, processes the call accordingly. The mobile switching centers used to perform this service area-dependent call processing are complex and costly. Therefore, it is desirable that service areas in a satellite communications system be defined on a regional basis so that the mobile switching centers and other equipment used to process calls in the terrestrial cellular invention may also be used to process calls originating from the satellite environment with little modification.

Thus, there is a need for an improved method of determining, in a satellite communications system, the service area within which a mobile user is located. Preferably, such a method would be efficient, rapid and compatible with the existing geographically defined service area system and associated equipment used in terrestrial cellular communications systems.

SUMMARY OF THE INVENTION

The present invention is embodied in a method of mapping a plurality of geographic regions on the surface of the earth, using the mapping to determine a target geographic region within which a target is located and then providing a service to the target that is associated with the target geographic region. Preferably, the disclosed method may be implemented in a satellite communication system to provide a satellite communication service to a subscriber unit located in a geographical region where a set of previously determined services are readily available such as a particular service area. The method is efficient, rapid and compatible with existing geographically defined service areas systems and associated equipment used in terrestrial cellular communication systems.

In accordance with one aspect of the invention, a method for mapping a plurality of geographical regions on the surface of the earth is provided wherein the method includes the steps of dividing each of the geographical regions into a plurality of non-overlapping tiles such that each tile is associated with only one geographical region and has four edges. Once defined, the tiles are mapped onto a two dimensional plane that represents the surface of the earth and a grid having a plurality of grid squares is overlaid onto the two dimensional plane.

In one aspect of the invention, the grid has both vertical grid lines and horizontal grid lines, wherein the vertical grid lines align with the lines of longitude and wherein the horizontal grid lines align with the lines of latitude. The vertical grid lines and the horizontal grid lines intersecting to form the plurality of grid squares.

In another aspect of the invention the method may be used to determine the target geographical location within which a target is located, wherein the target is positioned at a target location, using the map of the geographical regions and also using a previously determined estimate of the target location. First, the two dimensional plane is used to determine a target grid square in which the estimate of the target location is located. Next, a first set of tiles that intersect the target grid square are identified. Then a first set of geographical regions are obtained wherein the first set of geographical regions includes all of the regions associated with the tiles in the first set of tiles.

In a preferred embodiment, the first set of tiles are identified by creating a table that includes a list of each of the grid squares, wherein each of the grid squares corresponds to a different one of a plurality of lists, and wherein each of the lists comprises all tiles that overlap the corresponding grid square. Then the table may be referenced to obtain the unique list of tiles corresponding to the target grid square, wherein the unique list of tiles is subsequently used as the first set of tiles.

In another aspect of the invention, the method further includes the steps of determining whether the first set of geographical regions comprises a single one of the geographical regions; and if the first set of geographical regions comprises a single one of the geographical regions, then identifying the single one of the geographical regions as the target geographical region. If the first set of geographical regions does not comprise a single one of the geographical regions, then a target tile is identified, wherein the target tile comprises a tile in the first set of tiles within which the estimate of the target location in located. Next, the geographical region that is associated with the target tile is identified as the target geographical region. Lastly, a service that is associated with the target geographical region is provided to the target.

In one embodiment, the method may be employed in the context of satellite communications wherein each of the geographical regions comprises a service area, and each service area is associated with a satellite communication service. In this setting, the target may be a subscriber unit and the service that is provided to the subscriber unit is a satellite communication service.

In yet another aspect of the present invention, the method may be used to determine the target geographical region within which a target is located, using a previously determined estimate of the target location and using the map wherein the previously determined estimate of the target location comprises a region of error. The method includes the steps of identifying at least one target grid square, that intersects, at least in part, with the error region. Then a first set of tiles that intersect the target grid square are identified and used to obtain a set of geographical regions that are associated with the tiles in the first set of tiles.

In one aspect of the invention, the step of identifying the target grid square may be accomplished by converting the error region from a three dimensional region to a two dimensional region, overlaying the converted error region on the two dimensional plane and identifying the target grid square that intersects with the error region.

In one aspect the error region comprises a circular error region centered at the estimate of the target location such that the step of converting the region to a two dimensional region causes the region to become an elliptical region, and wherein the elliptical region is represented as a region bounded by a set of four boundaries that forming a rectangular region encompassing the elliptical region.

In yet another aspect of the invention, the method checks to see if the first set of geographical regions includes only a single one of the geographical regions. If so, then the single geographical region is the region within which the target geographical region and the service associated with the region is provided. If, instead, the first set of geographical regions does not include only one geographical region, then a second set of tiles are obtained that includes the tiles in the first set of tiles that intersect a boundary of the error region.

In one aspect of the invention, the step of obtaining the second set of tiles includes the steps of using geometrical methods, which may include point in polygon inclusion methods or ellipse and polygon intersection test, to determine whether any of the edges of the tiles in the first set of tiles intersect the error region boundary; and adding the tiles having an edge that intersects the error region boundary to the second set of tiles.

Lastly, a second set of geographical regions are identified wherein the second set of geographical regions includes all of the geographical regions that are associated with each of the tiles listed in the second set of tiles and then the method tests to determine whether the second set of geographical regions includes only a single one of the geographical regions. If so, then the one geographical region is identified as the target geographical region and service associated with that region is provided to the target. If, instead, the second set comprises more than one of the geographical regions, then a virtual geographical region is identified as the target geographical region and a service associated with the virtual geographical region is provided to the target.

The present invention further includes an apparatus coupled to a communication network for providing a communication service to a target located at a target location, wherein an estimate of the target location has been previously determined, the apparatus includes a switch coupled to the communication network, and a processor coupled to the switch. The processor is programmed to determine the target geographical location within which the target is located using the predetermined estimate of the target location and a map, wherein the map includes a plurality of geographical regions, wherein each of the geographical regions has been divided into a plurality of tiles such that each tile is associated with only one geographical region and has four edges. Additionally, the tiles have been mapped onto a two dimensional plane; wherein a grid having a plurality of grid squares has been overlaid on the two dimensional plane. The apparatus additionally includes a memory coupled to the processor, wherein data representing the map is stored in the memory. The processor is further adapted to provide the target geographical region to the switch which, in turn, is adapted to provide a communication service to the target based on the target geographical region provided by the processor.

In yet another aspect of the present invention, the apparatus further includes a central management computer coupled to the processor, wherein the central management computer is coupled to a graphical user interface that is adapted to create the map. The map is subsequently provided by the central management computer to the processor.

BRIEF DESCRIPTION OF THE DRAWINGS

The invention will be better understood from the following detailed description taken in conjunction with the accompanying figures of the drawings, wherein:

FIG. 7 illustrates a lookup table used to implement the present invention;

DESCRIPTION OF THE PREFERRED EMBODIMENTS

Figure 1:
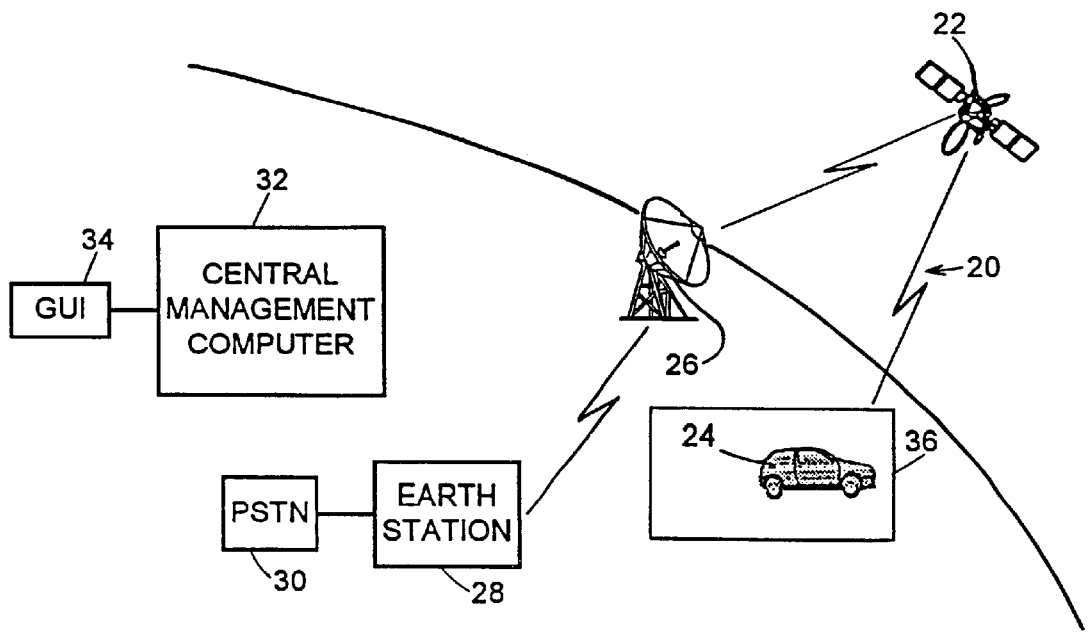
FIG. 1 is a block diagram of a satellite mobile communications system used to implement the method of present invention.

FIG. 1 illustrates a satellite communications system 20 for use with the present invention in which a low to medium earth orbit satellite 22 relays communication signals from a subscriber unit 24 to an earth based feeder antenna 26 and vice versa. The feeder antenna 26, in turn, communicates with one of a globally distributed network of earth stations 28 that are coupled to a terrestrial network that includes, for example, the public switched telephone network 30 ("PSTN") or a public switched data network ("PSDN"). A central management computer 32 coupled to the global network of earth stations 28 via high speed terrestrial links includes a graphic user interface ("GUI") 34. Although, for simplicity, only a single satellite 22 is shown in FIG. 1, the satellite communications system 20 can include a plurality of satellites 22 positioned in orbit to provide continuous overlapping coverage of the earth's surface. The subscriber unit 24, which may include, for example, a mobile telephone in an automobile, is physically located within one of a plurality of geographically defined service areas 36 (only one of which is shown in FIG. 1).

Figure 2:
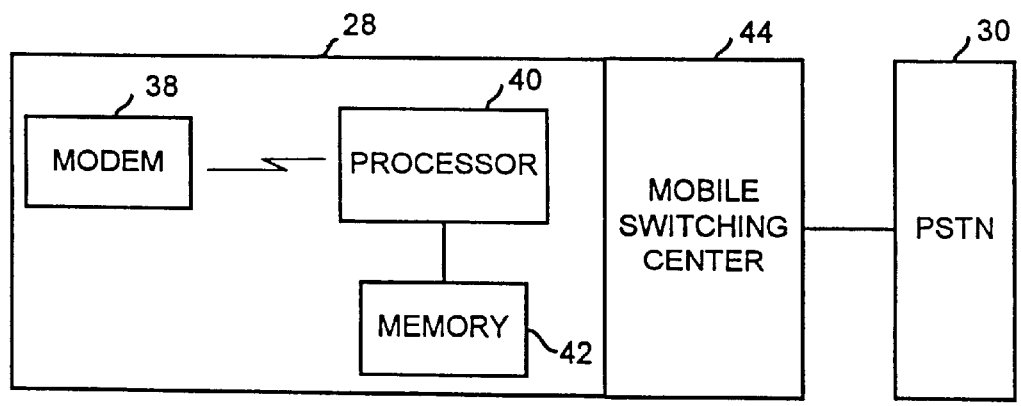
FIG. 2 is a block diagram illustrating further details of the earth station shown in FIG. 1.

Referring also to FIG. 2, the earth station 28 includes a plurality of modems 38 (only one of which is shown) each of which communicates with the feeder antenna 26 and also communicates with a processor 40 and associated memory 42. The earth station processor 40 is also coupled to a mobile switching center ("MSC") 44 that is coupled to the PSTN 30. The MSC 44 is programmed to provide access to the calling services that are offered in connection with the service area 36.

Figure 3:
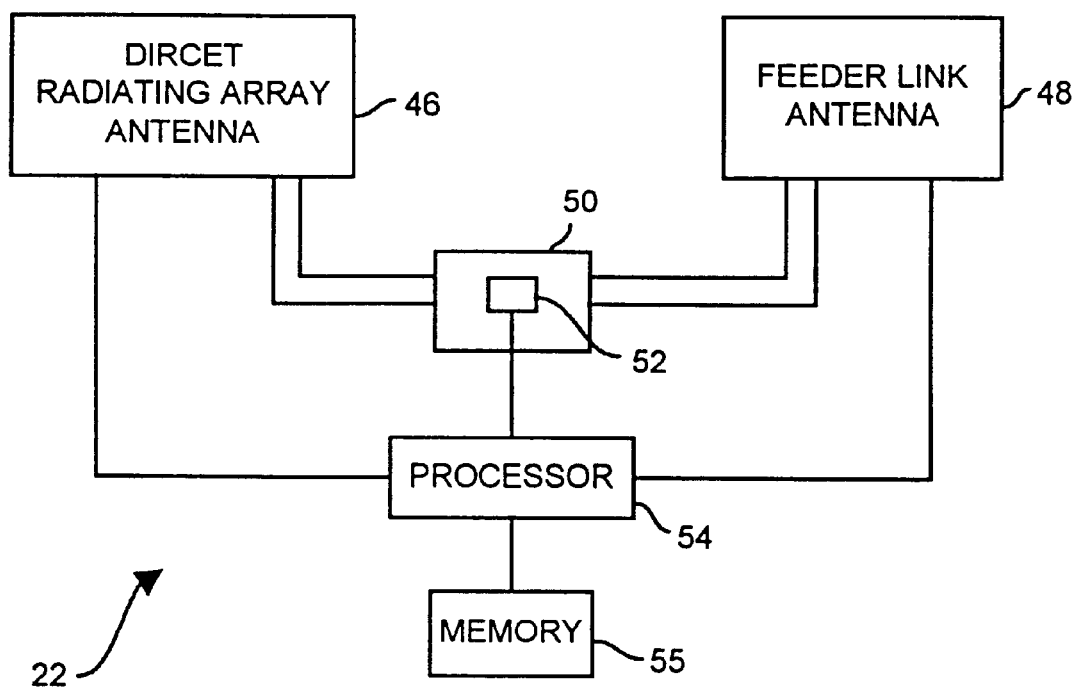
FIG. 3 is a block diagram illustrating further details of the satellite shown in FIG. 1.

Referring also to FIG. 3, the satellite 22 includes a direct radiating array antenna ("DRA") that supports communication between the subscriber unit 24 and the satellite 22. A feeder link antenna 48 supports communication between the satellite 22 and the earth station 28. The feeder link antenna 48 and DRA 46 are linked to a satellite processor 54 having associated memory 55.

In operation, signals originating from the earth station 28 are transmitted by the earth based antenna 26 to the feeder link antenna 48. The signals are then relayed to the subscriber unit 24 via the DRA 46. In addition, signals transmitted by the subscriber unit 24 are received at the DRA 46 and then relayed to the earth station 28 via the feeder link antenna 48. Because the feeder link antenna 48 and DRA 46 transmit and receive at different frequencies, a frequency translator 50 is used to convert the frequency of transmitted/ received signals, thereby allowing signals received at the DRA 46 to be transmitted by the feeder link antenna 48 and vice versa. In addition, the frequency translator 50 includes a signal extraction circuit 52 for extracting control signals that are then provided to a processor 54 which is adapted to control the operation of the frequency translator 50, the feeder link antenna 48 and the DRA 46 in response to the extracted control signals. Of course, it will be understood by one having ordinary skill in the art that the satellites 22 and earth stations 28 will additionally include circuitry adapted to perform call processing and to coordinate signal traffic between the satellites 22, the subscriber unit 24 and the PSTN 30.

Before implementing the method of the present invention, it is assumed that the surface of the earth has previously been partitioned into geographically defined service areas. As an overview, after the boundaries of the service areas 36 have been fully defined, a first part of the invention, hereinafter referred to as a pre call-processing portion of the method, is implemented using the GUI tool 34 residing at the central management computer 32. In particular, the GUI tool 34 is used to create a service area model wherein each previously defined service area is sub-divided into one or more quadrilateral tiles. In addition, using the earth station processor 40, the earth is divided into a grid composed of 64,800 squares each having dimensions of 1 degree latitude by 1 degree longitude. A lookup table is compiled that provides a list of tiles that intersect each grid square and that further provides the service area associated with each tile. Lastly, a set of virtual service areas are defined each of which represents a course of action to be taken by the MSC 44 in the event that the service area within which the subscriber unit is located cannot be identified with a suitable degree of accuracy. For example, if it has been determined that the subscriber unit is located within a group of tiles corresponding to more than one service area, but the precise service area in which the subscriber unit is located cannot be pinpointed, then a virtual service area rather than an actual service area ID is provided to the MSC 44.

Once the service area model is created using the GUI tool 34, the central management computer 32 distributes the model to the global network of earth stations 28. When a satellite system call is initiated by the subscriber unit 24, the second part of the method of the present invention, hereinafter referred to as the call-processing portion of the method, is executed by the earth station processor 40. During the call-processing portion of the method, the position of the subscriber unit 24 is estimated in units of degrees longitude and latitude. Because the positional estimate is prone to error, the earth station processor 40 also approximates a circular region of error within which the subscriber unit 24 is likely to be located.

To identify the service area in which the calling unit 24 is located, the earth station processor 40 determines which of the grid squares intersect the error region and then accesses the lookup table to identify the tiles that are associated with the intersecting grid squares. If the identified tiles all correspond to the same service area, then the service area ID is transferred to the MSC 44 which thereafter uses the ID to process the call accordingly.

If, instead, the identified tiles are associated with more than one service area, then the processor 40 uses geometrical methods to rapidly identify the subset of tiles that intersect the error region. If the resulting subset of identified tiles correspond to a single service area, then the corresponding service area ID is transmitted to the MSC 44 which processes the call accordingly. If instead the subset of tiles correspond to more than one service area, then a virtual service area is identified and the ID corresponding to the virtual service area is transferred to the MSC 44 which processes the call accordingly.

Figure 4:
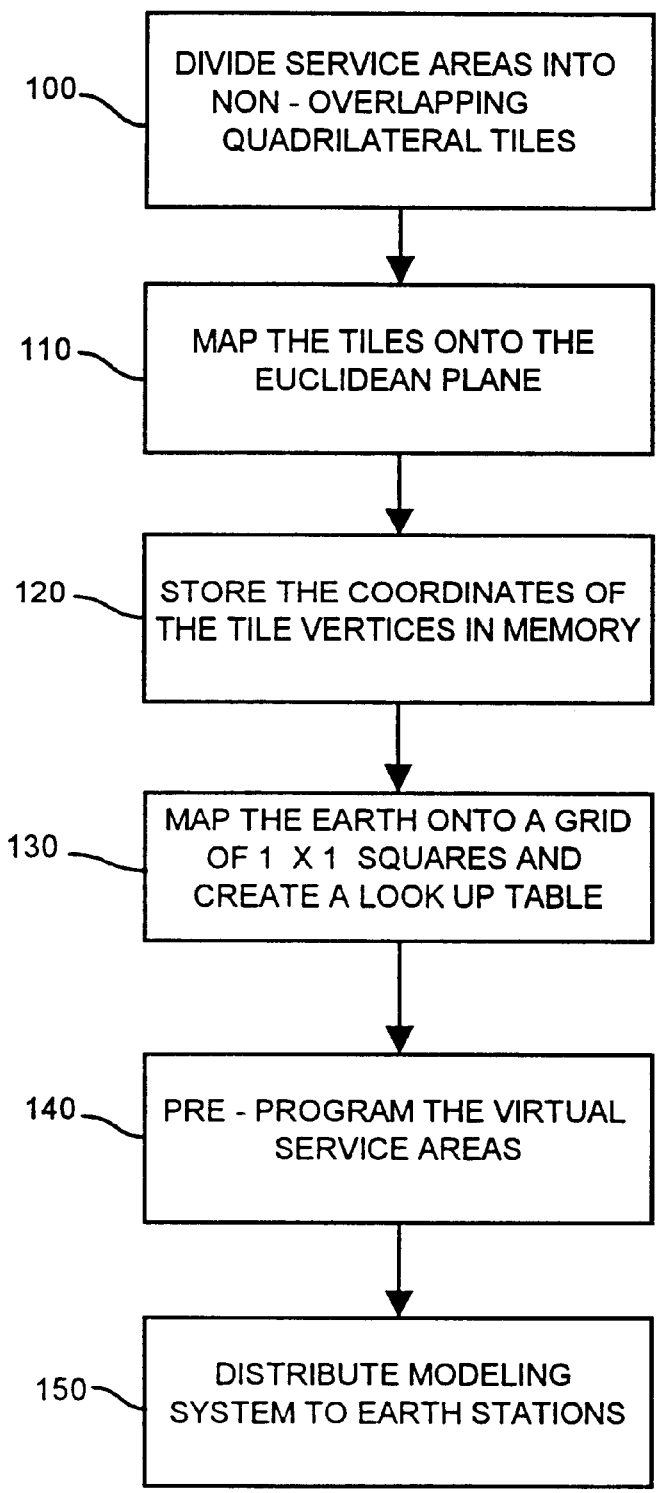
FIG. 4 is a flow chart of the pre-call processing portion of the method of the present invention.
Figure 5A:
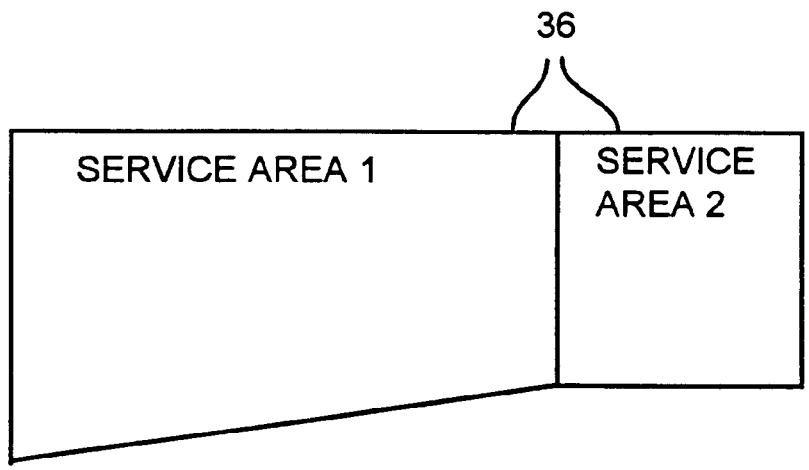
FIG. 5A illustrates two service areas.
Figure 5B:
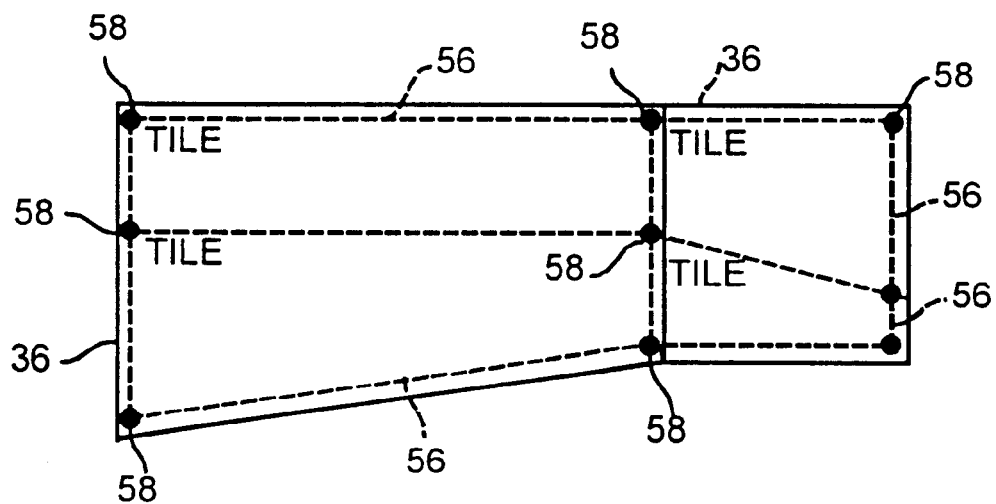
FIG. 5B illustrates two service areas that have been subdivided into two tiles.

Referring now to FIG. 4 which provides a flow chart of the pre-call processing portion of the method of the present invention and to FIGS. 5A and 5B which illustrate a portion of the service area model of the present invention, the service area modeling begins at a block 100 where each service area 36 (see FIG. 5A) is divided into non-overlapping quadrilateral tiles 56 (see FIG. 5B) the edges of which may be oriented in any direction. Although, for illustrative purposes FIGS. 5A and 5B only show two service areas 36 that each have been subdivided into two tiles 56, the method of the present invention is actually intended to support a modeling system that includes a plurality of service areas 36 that are positioned to cover the surface of the earth and a plurality of corresponding tiles 56. The tiles 56 are positioned within the service areas 36 such that each tile 56 corresponds to only one service area 36 so that once the earth station processor 40 has identified the tile 56 within which the subscriber unit 24 is located, the service area 36 is also known. In addition, each quadrilateral tile 56 is completely defined by a set of four vertices 58. In general, there will be many more tiles than service areas and the subdivision of service areas will be relatively static and will typically change only when new requirements or regulations are placed on the satellite communications system 20. Although, the service areas 36 shown in FIGS. 5A and 5B are four sided polygons, as described hereinbefore, the service areas 36 will generally be irregularly shaped to accommodate geopolitical borders. The use of quadrilateral tiles enables the use of geometrically simplified methods for determining the location of the subscriber unit thereby eliminating the processing complexity that would be required to locate the position of the subscriber unit relative to the intricately shaped service areas 36.

To eliminate the distortion that is commonly encountered when mapping the severely curved polar regions of the earth, the service areas of the polar regions are modeled differently than the service areas located in non-polar regions. In particular, the service areas located at the north and the south poles are defined as circular tiles having boundaries that follow a constant line of latitude of, for example, +/−85 degrees. As a result, a subscriber unit 24 is located in a polar tile if the latitudinal position of the subscriber unit is larger in absolute value than the latitude of either polar tile boundary, i.e., greater than 85°. By defining the polar regions in this manner, the exact location of a subscriber unit 24 located within a polar tile need not be pinpointed.

Figure 6A:
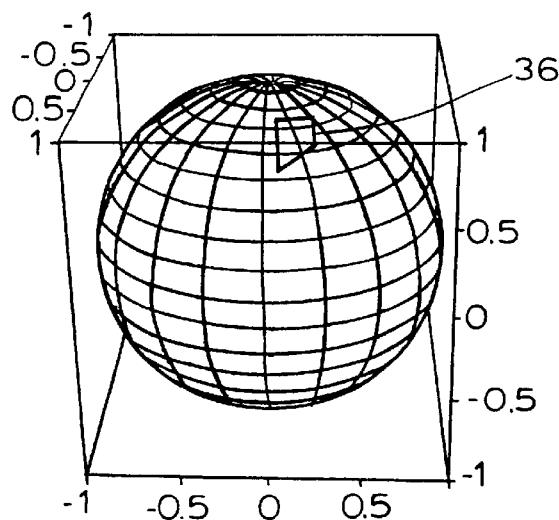
FIG. 6A illustrates the earth with a tile location shown.
Figure 6B:
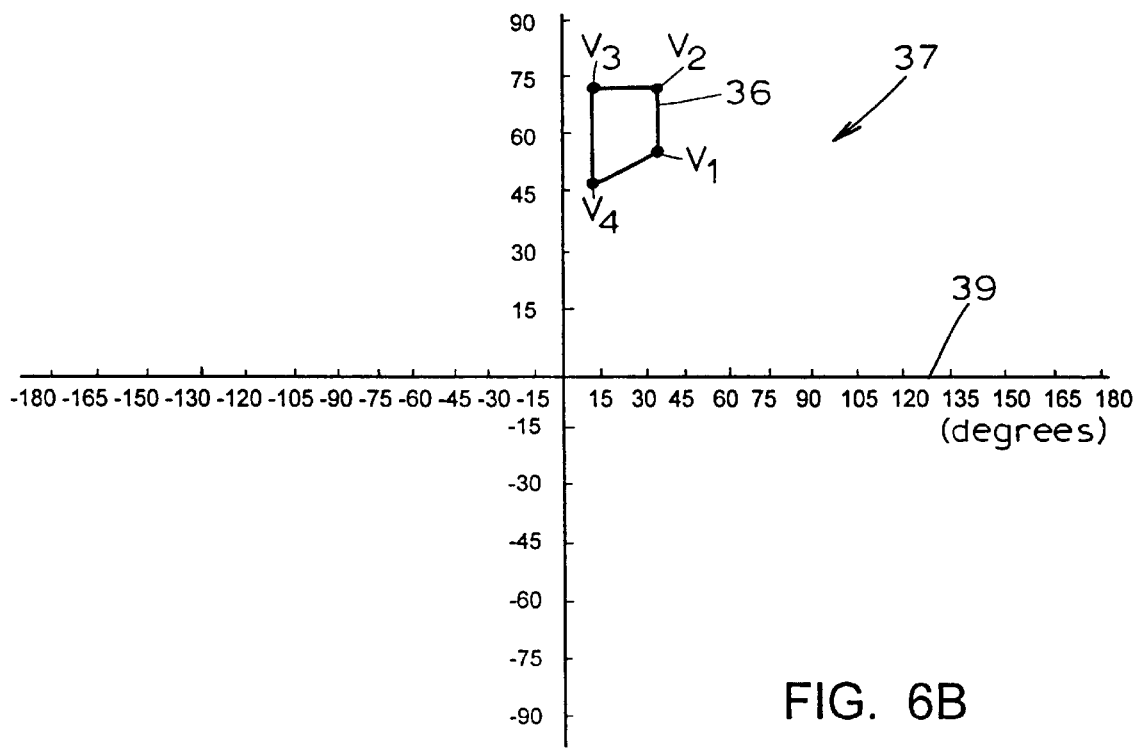
FIG. 6B illustrates the two-dimensional grid to which the tiles are mapped.
Figure 6C:
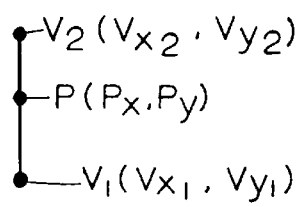
FIG. 6C illustrates a tiles edge having vertices $V_1$ and $V_2$ and point P.

Next, at a block 110, a map 37 (see FIG. 6B) is created by mapping the tiles 56 onto a Euclidean plane 39 that is used to model the earth's surface. Referring also to FIG. 6A, which shows the tile 36 on the earth, and to FIG. 6B, which shows the Euclidean plane on which the tile 36 is mapped, the y-axis in the Euclidean plane is a measure of latitude in units of degrees spanning from −90° to +90°, and the x-axis is a measure of longitude in units of degrees spanning from −180° to +180°. On the Euclidean plane, each of the tiles are completely defined by the locations of its four vertices 58, denoted $V_i$ wherein the variable i represents integer values ranging from one to four, such that the mapping process involves storing the coordinates of each tile vertex relative to the Euclidean plane (in degrees longitude and latitude) in the memory 42 associated with the processor 40. Referring also to FIG. 6C, the edges of each tile are defined such that a point P lies on an edge between two vertices, such as, for example, $V_i$ and $V_{i+1}$ if and only if there exists a unique value for t that lies in the interval [0,1] such that:

$$P_x = (1-t)V_{x_i} + V_{x_{i+1}} \quad (1)$$

$$P_y = (1-t)V_{y_i} + V_{y_{i+1}} \quad (2)$$

where $V_{x_i}$ and $V_{y_i}$ are the longitudinal and latitudinal coordinates, respectively, of a first vertex, $V_i$, of the tile;

$V_{x_{i+1}}$ and $V_{y_{i+1}}$ are the longitudinal and latitudinal coordinates, respectively, of a second vertex, $V_{i+1}$, that is adjacent to the vertex, $V_i$; and $P_x$ and $P_y$ are the longitudinal and latitudinal coordinates, respectively, of a point, P lying at any location along the tile edge.

The use of equations (1) and (2) to define the tile edges greatly simplifies the method of the present invention by ensuring that, for the edges of each tile, there exists a unique map from the surface of the earth to the Euclidean plane which preserves the structure of the quadrilateral tiles. As can be seen with reference to FIGS. 6A and 6B, as a result of the mapping process the three dimensional tiles are converted to two dimensional tiles, thereby eliminating the need to perform complex spherical geometrical calculations. In addition, the two dimensional Euclidean representation of the tiles enables the use of simplified geometrical methods for determining whether a subscriber unit 24 is located in a particular tile as will be described more fully in connection with the call-processing portion of the method.

Referring still to FIG. 4, next, at a block 130, the Euclidean plane representing the earth is divided into 64,800 grid squares each having dimensions of 1°×1°. Note, however, that the grid squares are not shown in FIG. 6B. Referring also to FIG. 7, a lookup table 60 is configured having a range of rows indexed by the variable m and also having a range of columns indexed by the variable n. The rows m correspond to the latitudinal range of the tiling grid squares, i.e., −90° to +90° and the columns n correspond to the longitudinal range of the tiling grid squares, i.e., −180° to +180°. Thus each location in the lookup table 60 corresponds to a particular grid square of the 1°×1° global grid. At each lookup table location an address is stored. Each stored address points to a memory location at which a list of tiles that intersect the corresponding grid square are stored. For example, the lookup table location of row m and column n which corresponds to the grid square m,n includes the address of a list labeled m,n. The list m,n provides a listing of tiles that intersect the m,n grid square. In operation, once the grid square(s) in which a subscriber unit 24 is located has been determined, an intersecting list of tiles is rapidly identified via the address provided in the lookup table 60. Thus, the number of tiles 56 within which the subscriber unit 24 may be located is limited to those tiles 56 associated with the identified grid square(s). As will be appreciated by one having ordinary skill in the art, the tiling grid structure and lookup table 60 are advantageous because the method of the present invention does not limit the number of tiles 56 that may be defined by a service provider. Therefore, the number of tiles 56 within which the subscriber unit 24 may be located may easily reach the tens of thousands especially since accuracy is required when tiling national borders and military installations. By using the tiling grid structure the number of tiles that qualify as candidates within which a subscriber unit 24 may be located is limited and the amount of processing performed by the earth station processor 40 in later operations is reduced.

After the lookup table 60 has been created, control proceeds to a block 140, where a set of virtual service areas that have been previously defined are pre-programmed into the MSC 44. Each virtual service area represents a course of action to be taken by the earth station processor 40 when the service area 36 in which the subscriber unit 24 is located cannot be determined with a suitable degree of accuracy. To define the set of virtual service areas, all possible combinations of service areas that may intersect a single error region due to geographical proximity are identified. Next, a course of action to be taken by the processor is created for the virtual service area. For example, to enable processing of a call that is initiated in an error region that intersects two service areas, a first of which has no restrictions and a second of which bars all call, the processor is programmed with a corresponding virtual service area. Typically, the virtual service area will encapsulate the worst case scenario of the intersected service areas and, so, in the example provided above would cause the earth station processor 40 to bar the call in order to prevent a possible violation of the second, restrictive service area. Of course, the actions to be taken by the earth station processor 40, i.e., types of services to be provided and those to be restricted, for calls associated with non-virtual service areas are assumed to have been previously defined. If additional service areas are later defined, then the MSC 44 may be updated at that time to include such new service areas. The modeling system created in the pre-call processing portion of the present invention that is represented by the blocks 100–140 is subsequently distributed to the global network of earth stations 28 at a block 150.

Figure 8A:
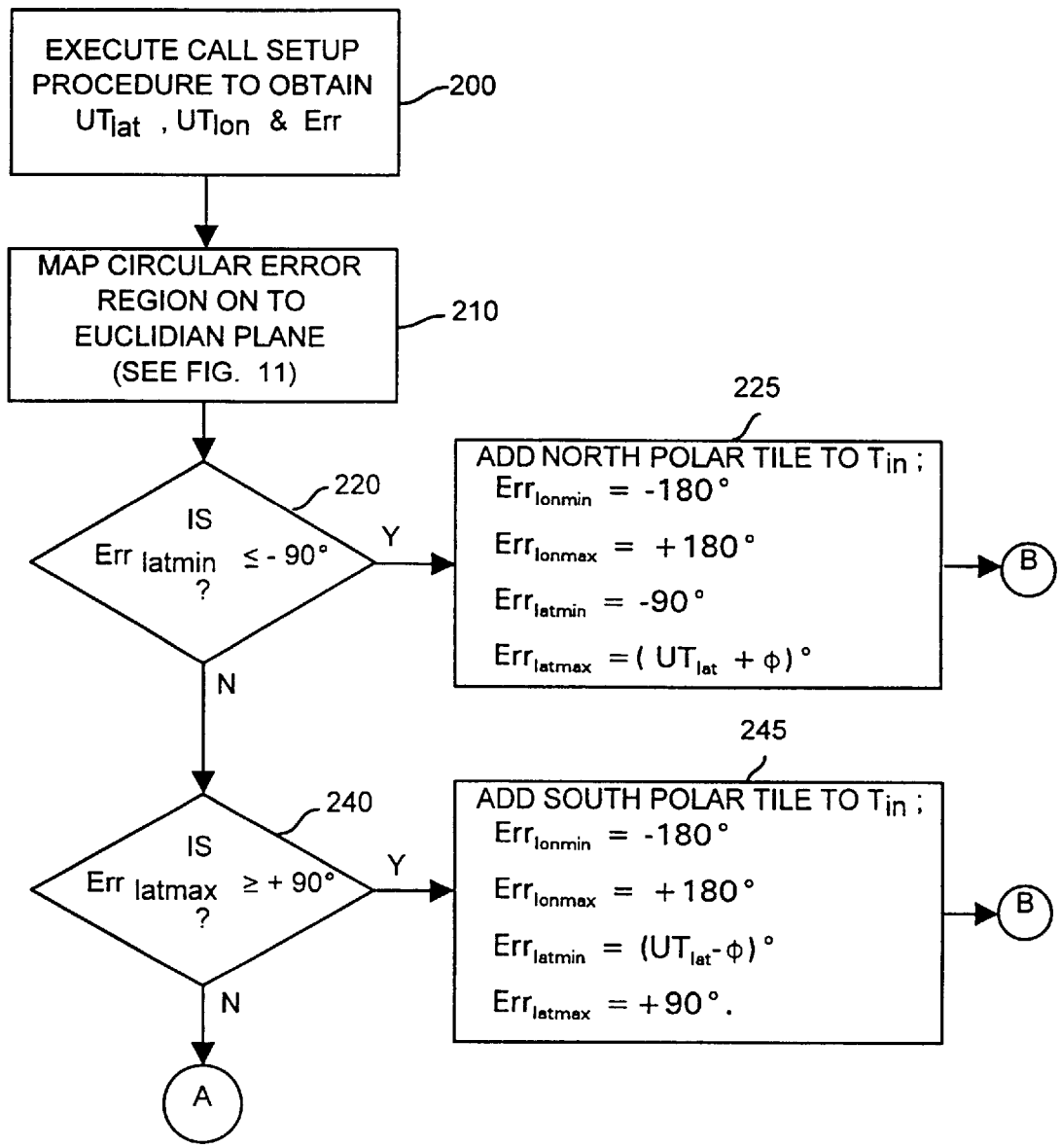
FIGS. 8A, 8B and 8C are a flow chart of a portion of the call-processing portion of the method of the present invention.
Figure 8B:
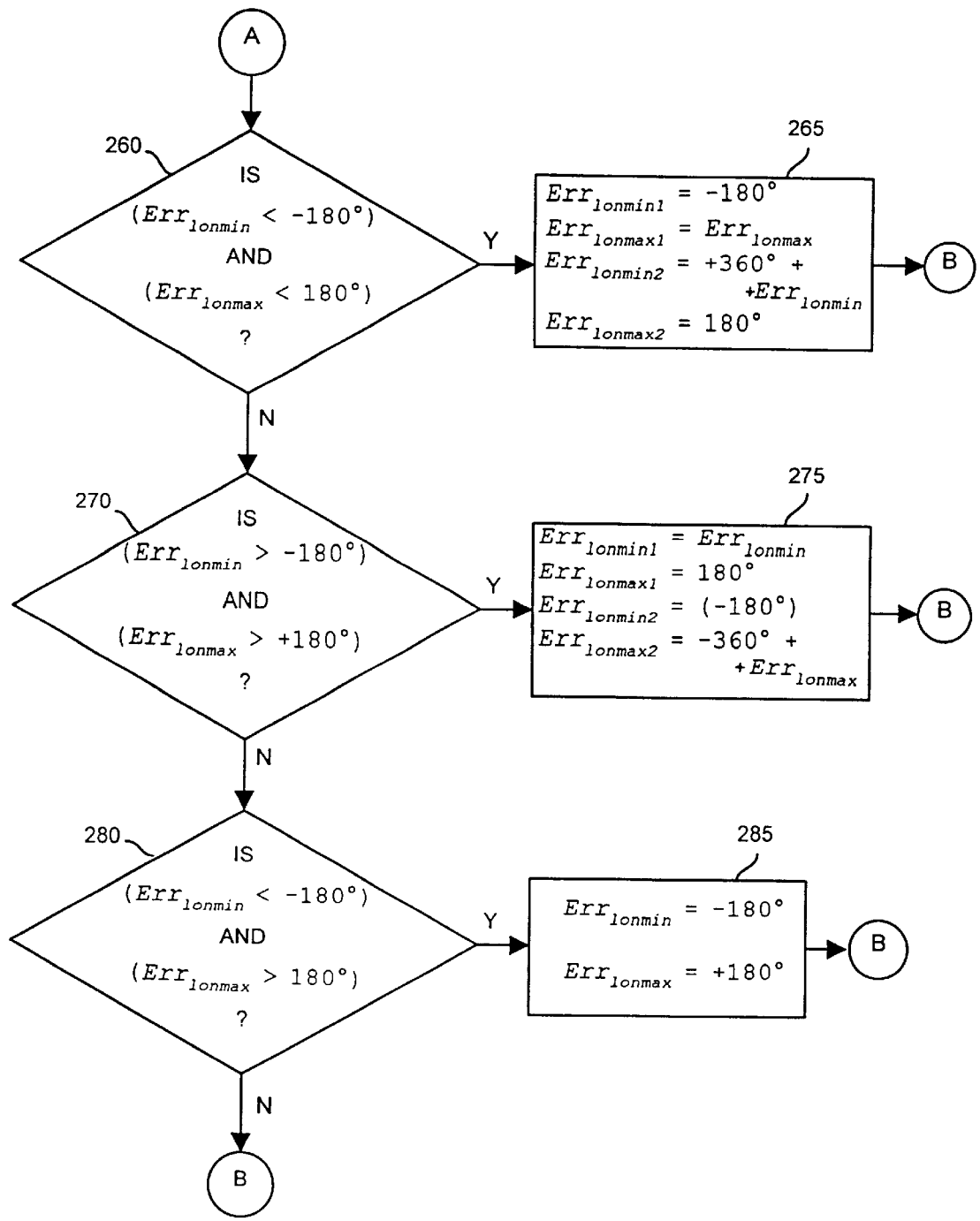
Figure 8C:
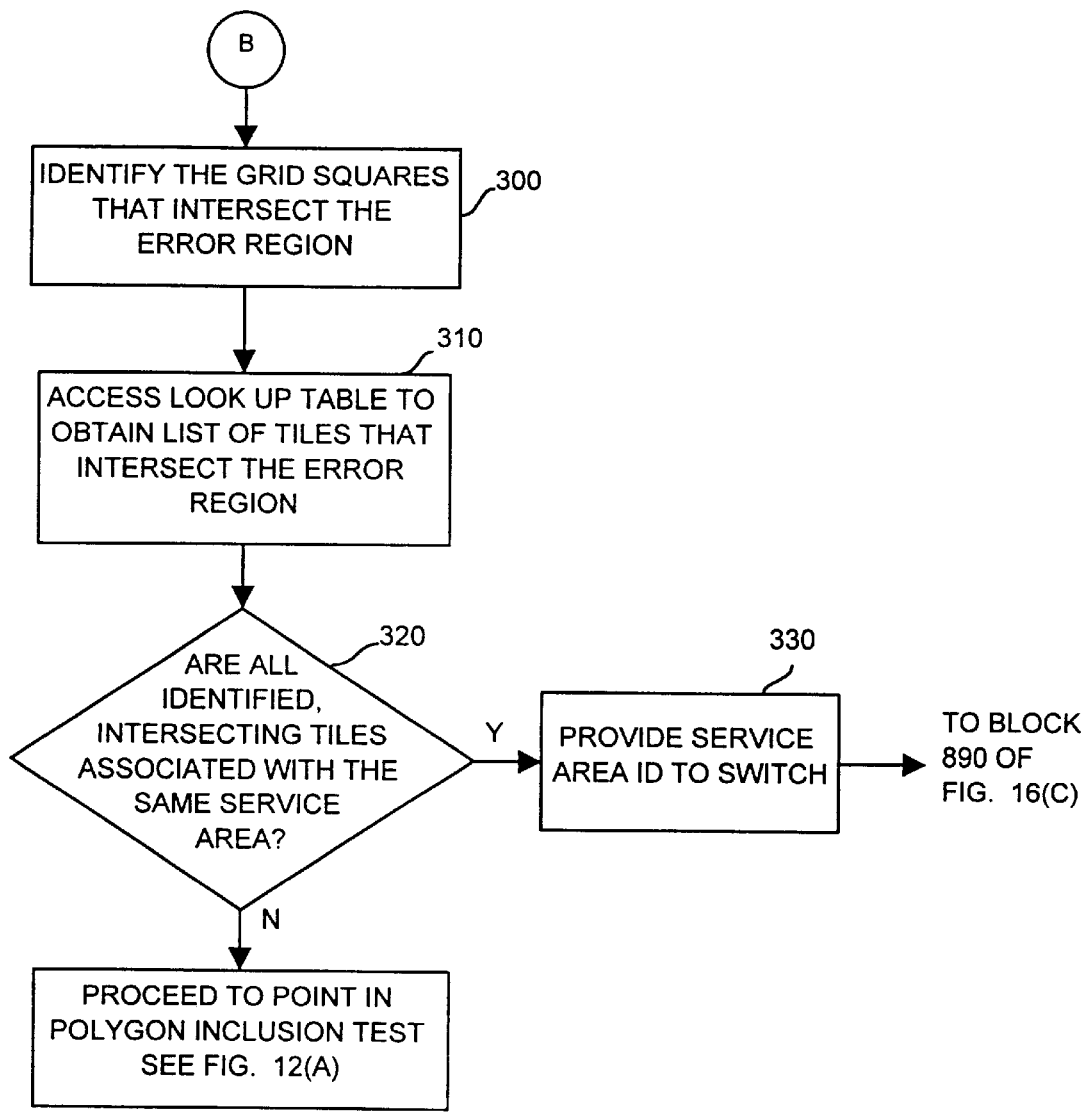
Figure 9:
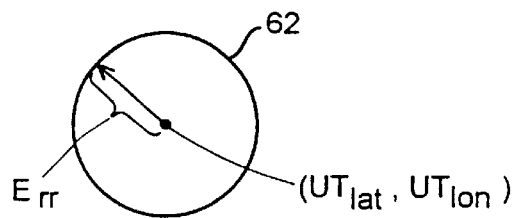
FIG. 9 illustrates a circular approximated error region wherein the center of the error region is the location of the subscriber unit.

Referring now to FIGS. 8A–8C which provide a flow chart of the beginning of the call-processing portion of the method of the present invention, the method continues at a block 200 when a satellite system call is initiated by, for example, the subscriber unit 24. Upon call initiation, a conventional call setup procedure is executed by the processor 40 in which various parameters of the call are defined. A variety of conventional call setup procedures are well known in the art and may include any number of steps. Referring also to FIG. 9, during call setup the earth station processor 40 uses information received from the subscriber unit 24 and from the satellite processor 54 to estimate the position of the subscriber unit 24 in degrees latitude and longitude represented as $UT_{lat}$ and $UT_{lon}$, respectively. The earth station processor 40 also determines the amount of error associated with the positional estimate, $UT_{lat}$, $UT_{lon}$. The error, which is represented by the variable Err, is assumed to radiate outwardly from $UT_{lat}$, $UT_{lon}$ thereby forming a circular error region 62 within which the subscriber unit 24 is assumed to be located. The error, Err, may be chosen so that the resulting circular error region 62 has a desired probability, e.g., 95%, of encompassing the actual position of the subscriber unit 24.

As there are a number of conventional methods used to estimate the position of the mobile caller, it is to be understood that any of these well-known methods are suitable for use with the present invention. It is further to be understood that the processor 40 may be programmed, using conventional methods, to implement any of these well known methods for estimating the position of the subscriber unit 24.

In addition, the position of the subscriber unit 24 and the error, Err, associated with the position may be determined using any alternative means known in the art and need not be performed exclusively by the earth station processor 40. For example, the subscriber unit 24 may instead calculate the position and error provided that the calculated positional information is thereafter relayed to the processor 40 via the satellite 22.

Referring now to FIGS. 8A–8C and 10, after the circular error region has been defined, control proceeds to a block 210 where the processor 40 maps the circular error region onto the Euclidean Plane 39. However, due to the non-parallel nature of the lines of longitude, the circular error region 62 becomes distorted when mapped to the Euclidean plane 39 thereby causing it to take on an elliptical shape. To forego the mathematical complexity of mapping each point on the circular error region 62 to the Euclidean plane 39 to obtain an elliptical error region, a rectangular region 64 that approximates the elliptical error region is instead determined. A set of four sides 66, 68, 70 and 72 of the rectangular region 64 are positioned at the minimum and maximum latitudinal and longitudinal boundaries of the ellipse. For example, one side 66 of the rectangle 64 is positioned at a point of the ellipse 62 having the highest latitude, $Err_{latmax}$ and another side 68 of the rectangle 64 is positioned at the point of the ellipse 62 having the lowest latitude, $Err_{latmin}$. The two remaining sides 70 and 72 of the rectangular region 64 are positioned at the points of the ellipse 62 having the lowest and highest longitudes, $Err_{lonmin}$ and $Err_{lonmax}$, respectively. The set of steps for deriving the equations used to calculate $Err_{latmax}$, $Err_{latmin}$, $Err_{lonmax}$ and $Err_{lonmin}$ are provided in FIG. 11. In operation, the earth station processor 40 is programmed to use the resulting equations to calculate the values of $Err_{latmin}$, $Err_{latmax}$, $Err_{lonmin}$ and $Err_{lonmax}$ and to use the calculated values to model the rectangular region 64.

Figure 11:
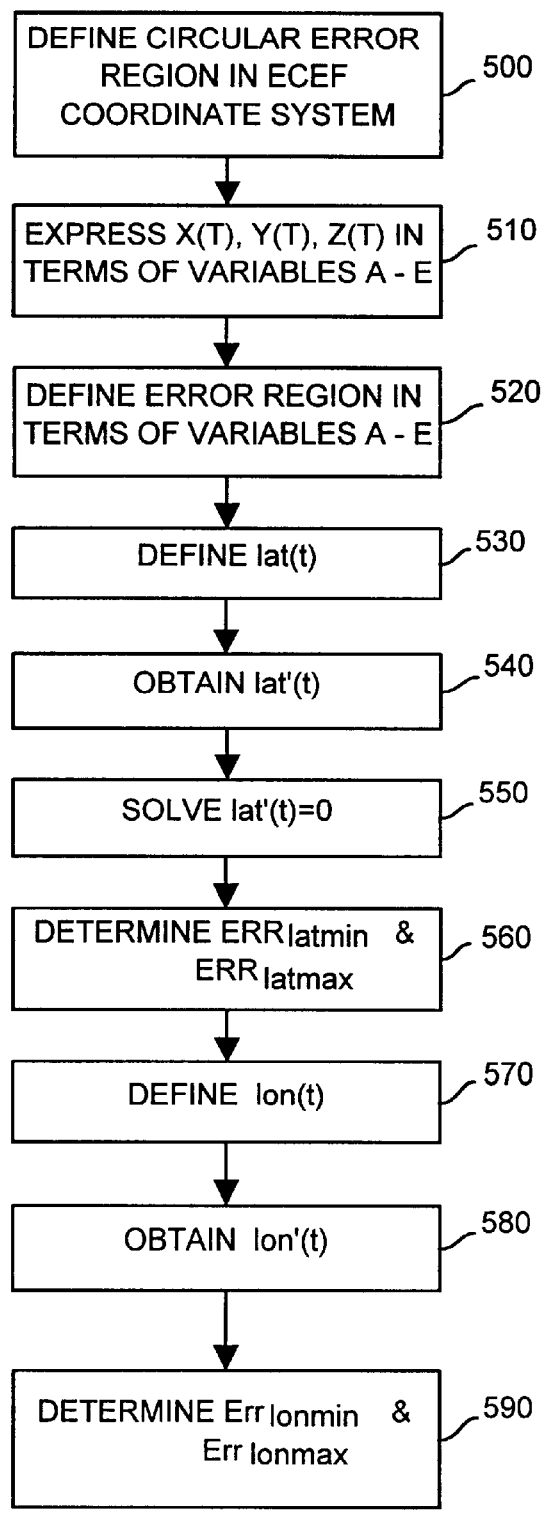
FIG. 11 is a flow chart showing the steps taken to determine the location of the rectangular region.

Referring now to FIG. 11, the set of steps used to determine the equations used to solve for $Err_{latminn}$, $Err_{latmax}$, $Err_{lonmin}$ and $Err_{lonmax}$ begin at the block 500 where the circular error region 62 is parameterized relative to an earth centered earth fixed ("ECEF") coordinate system that rotates with the earth. In the three dimensional ECEF coordinate system the positive x axis is defined as a vector having a point at the center of the earth and intersecting 0° longitude and 0° latitude, the positive z axis is defined as a vector that originates at the center of the earth and that extends through the north pole and the positive y axis is defined as a vector that originates at the center of the earth and occupies a position such that the y axis forms a right angle with both the x and the z axes in a right-handed triple. The parameterized circular error region 62 is defined in the ECEF coordinate system as follows:

$$\begin{Bmatrix} x(t) \\ y(t) \\ z(t) \end{Bmatrix} = R_Y(UT_{lat}) \begin{Bmatrix} RAD_E \cos\varphi \\ RAD_E \sin\varphi \cos t \\ RAD_E \sin\varphi \sin t \end{Bmatrix}, 0 \le t < 2\pi \quad (3)$$

where $UT_{lat}$ is the latitudinal coordinate of the center of the error region, i.e., the latitudinal coordinate of the position of the subscriber unit 24;

$R_Y(UT_{lat})$ is a rotation about the y-axis centered at $UT_{lat}$;

$RAD_E$ is the standard WGS-84 radius of the earth at the equator; and $$\varphi = \frac{Err}{RAD_E}.$$

To simplify the calculations to follow, the longitudinal position of the subscriber unit 24, $UT_{lon}$ is assumed to be equal to zero, i.e., the error region is assumed to be centered at the 0° meridian. This assumption does not affect the accuracy of the remaining calculations because the amount of distortion in the longitudinal direction is independent of the subscriber unit's longitudinal position. In addition, to benefit from the simplified modeling used for the polar regions, i.e., modeling the polar tiles as circular tiles that cap the poles, it is also assumed that the error region does not contain either pole. To compensate for this assumption regarding the poles, the method of the present invention includes steps to test for the possibility that the subscriber unit 24 is located in a polar tile as will be described more fully hereinbelow.

Next, at a block 510, to simplify the mapping process, a set of variables A–E are assigned the following values:

$$A = RAD_E \cos(UT_{lat})\cos(\phi) \quad (4)$$

$$B = RAD_E \sin(UT_{lat})\sin(\phi) \quad (5)$$

$$C = RAD_E \sin(\phi) \quad (6)$$

$$D = RAD_E \sin(UT_{lat})\cos(\phi) \quad (7)$$

$$E = RAD_E \cos(UT_{lat})\sin(\phi) \quad (8)$$

After the variables A–E have been defined, control proceeds to a block 520 where the parameterized circular error region 62 represented by Eq. 3 is expressed in terms of the variables A–E as follows:

$$\begin{Bmatrix} x(t) \\ y(t) \\ z(t) \end{Bmatrix} = \begin{Bmatrix} A - B\sin(t) \\ C \cos(t) \\ D + E \sin(t) \end{Bmatrix}. \quad (9)$$

Next, at a set of blocks 530, 540, 550 and 560, the steps used to determine the latitudinal boundaries of the rectangular region are provided. As an overview, the steps involve defining the latitude of the error region in terms of an equation, taking the derivative of the equation and then setting the equation equal to zero to determine where the minimum and maximum values of latitude occur. This process begins at the block 530, where the latitude of any point on the error region is defined by the following:

$$lat(t) = \arcsin\left(\frac{D + E\sin(t)}{RAD_E}\right)\frac{180}{\pi}. \quad (10)$$

Then, at a block 540, the derivative of lat(t), denoted lat'(t), is obtained as follows:

$$lat'(t) = \frac{180 E\cos(t)}{\pi[(RAD_E^2 - (D + E\sin(t))^2]^{\frac{1}{2}}} \quad (11)$$

Note that because it has been assumed that the error region does not contain either pole, lat'(t) is defined for all values of t, i.e., $D + E \sin(t) \pm RAD_E$.

At the block 550, the values of t at which the minimum and maximum points of latitude occur are determined by setting Eq. 11 equal to zero and solving for t. Setting Eq. 11 equal to zero and solving for t yields t=±π/2 which is substituted into Eq. 11 at a block 560 to obtain the maximum and minimum latitudes, $\text{Err}_{latmax}$ and $\text{Err}_{latmin}$ for the rectangular region 64 as follows:

$$Err_{latmin} = \arcsin\left\{\frac{D-E}{RAD_E}\right\} \tag{12}$$

$$Err_{latmax} = \arcsin\left\{\frac{D+E}{RAD_E}\right\} \tag{13}$$

The values of $\text{Err}_{latmax}$ and $\text{Err}_{latmin}$ are then obtained by substituting the values assigned to the variables D and E into Eqs. 12 and 13 and obtaining:

$$Err_{latmin} = UT_{lat} - \phi \tag{14}$$

$$Err_{latmax} = UT_{lat} + \phi \tag{15}$$

Thus, the earth station processor 40 uses Eqs. 14 and 15 to determine the values of $\text{Err}_{latmin}$ and $\text{Err}_{latmax}$, respectively.

Next, at a set of blocks 570, 580 and 590, the steps used to determine the longitudinal boundaries of the rectangular region are provided. The determination begins at the block 570 where the longitude of any point on the error region is defined as follows:

$$lon(t) = \arcsin\left\{\frac{C\cos(t)}{A - B\sin(t)}\right\}\frac{180}{\pi}. \tag{16}$$

Control then proceeds to a block 580 where the derivative of lon(t), denoted lon'(t), is obtained as follows:

$$lon'(t) = \frac{1}{1 + \left\{\frac{C\cos(t)}{A-B\sin(t)}\right\}^2} D_t\left\{\frac{C\cos(t)}{A-B\sin(t)}\right\}\frac{180}{\pi} \tag{17}$$

wherein $D_t$ is the derivative with respect to t.

Next, Eq. 17 is simplified to yield the following:

$$lon'(t) = \frac{BC - AC\sin(t)}{\left\{1 + \left\{\frac{C\cos(t)}{A-B\sin(t)}\right\}^2\right\}(A-B\sin(t))^2}\frac{180}{\pi}. \tag{18}$$

As can be seen, the maxima for lon (t) occur when BC-AC sin(t)=0. Note that to avoid an indefinite result, it is assumed that the error region does not cross the 180° meridian. At the block 580, the values of t at which the minimum and maximum points of longitude occur are determined by setting Eq. 18 equal to zero, solving for t and substituting the values assigned to the variables A, B and C as follows:

$$t_2 = \begin{cases} \arcsin(\tan(UT_{lat})\tan(\varphi)) \\ \pi - \arcsin(\tan(UT_{lat})\tan(\varphi)) \end{cases} \tag{19}$$

Since we've assumed that the error region does not contain a pole, it can be shown that the solutions for Eq. 18 qualify as two unique solutions representing both the minima and maxima of the longitudinal values.

Finally, to compensate for the shift in longitude that occurred when the longitudinal position, $UT_{lon}$, of the subscriber unit 24 was set to 0°, at the block 590, the actual minimum and maximum longitudinal values of the error region are obtained by shifting lon($t_2$) by $UT_{lon}$ as follows:

$$Err_{lonmin} = UT_{lon} - lon(t_2) \tag{20}$$

$$Err_{lonmax} = UT_{lon} + lon(t_2) \tag{21}$$

Thus, the processor 40 uses Eqs. 20 and 21 to determine the values of $\text{Err}_{lonmin}$ and $\text{Err}_{lonmax}$, respectively.

As will be appreciated by one having ordinary skill in the art, although the parameters of the rectangular region are approximated for each call, the steps of blocks 500–590 are not executed by the earth station processor 40 every time a call is initiated. Rather, once the processor 40 has been provided with the values of $UT_{lat}$ and $UT_{lon}$ and the length of the radius of the error region 62, Err, the processor 40 determines the values of $\text{Err}_{latmax}$, $\text{Err}_{latmin}$, $\text{Err}_{lonmax}$ and $\text{Err}_{lonmin}$ using Eqs. 14, 15, 20 and 21.

Referring again to FIGS. 8A–8C and 10, after the positions of the sides 66, 68, 70 and 72 of the approximating rectangular region 64 have been defined, control proceeds from the block 210 to a block 220, where the processor 40 determines whether the rectangular region 64 intersects the south polar tile by testing to see if the following inequality is satisfied:

$$Err_{latmin} \leq -90° \tag{22}$$

If the inequality of Eq. 22 is satisfied, then the error region intersects the tile that caps the south pole. At this point, control proceeds to a block 225 where the polar tile is used to start a list of tile candidates, denoted $T_{in}$, within which the subscriber unit 24 may be located. In addition, the boundaries of the approximating rectangular error region are redefined as follows:

$Err_{lonmin} = -180°$ $Err_{lonmax} = +180°$ $Err_{latmin} = -90°$ $Err_{latmax} = (UT_{lat} + \phi)°$.

After the block 225 control proceeds to a block 300 described hereinafter. Note that defining the error region boundaries in this manner assumes that an error region that intersects the south pole is more or less centered at the south pole. This is a reasonable assumption because error regions are typically quite small in the polar regions and less accuracy is required at such low latitudes.

If the inequality of Eq. 22 is not satisfied, then control proceeds to a block 240 where the processor 40 determines whether the rectangular region intersects the tile that caps the north pole by testing the following inequality:

$$Err_{latmax} \geq +90° \tag{23}$$

If the inequality expressed in Eq. 23 is satisfied, then the approximating rectangular region intersects the tile that caps the north pole. At this point control proceeds to a block 245, where the tile that caps the north pole is the first tile added to the list of tile candidates, $T_{in}$, within which the subscriber unit 24 may be located. In addition, the boundaries of the error region are redefined as follows:

$Err_{lonmin} = -180°$ $Err_{lonmax} = +180°$ $Err_{latmin} = (UT_{lat} - \phi)°$ $Err_{latmax} = +90°$.

After the block 245 control proceeds to a block 300 described hereinafter. Note that defining the error region boundaries in this manner assumes that an error region that intersects the north pole is more or less centered at the north pole. This is a reasonable assumption because error regions are quite small in the polar regions and less accuracy is required at such high latitudes.

If the inequality expressed in Eq. 23 is not satisfied, then the error region does not intersect either polar tile and control proceeds to a set of blocks 260, 270 and 280 where the processor 40 determines whether the longitudinal range of the rectangular region 64 spans the 180° meridian. This step is necessary because, as described earlier, the earth is modeled in a Euclidean plane 39 having a range that spans from −180° to +180°. Therefore, the model will not support error regions that are expressed in terms of longitudinal values greater than +180° or less than −180°. This scenario occurs when the addition or subtraction of $lon(t_2)$ to/from $UT_{lon}$ to obtain $Err_{lonmin}$ and $Err_{lonmax}$ (see equations 20 and 21) results in a value(s) having a magnitude that is outside of the acceptable range. Thus, when an unacceptable longitudinal range exists, the longitudinal boundaries of the error region must be redefined. First, the earth station processor 40 determines whether an unacceptable range exists, by testing a set of inequalities at a set of blocks 260, 270 and 280.

At the block 260, the processor 40 tests a first of the set of inequalities as follows:

$$(Err_{lonmin} < -180°) \text{ AND } (Err_{lonmax} < 180°) \quad (24)$$

If the inequality of Eq. 24 is satisfied, thereby indicating that the rectangular region spans the 180° meridian, then, at a block 265, the error region is partitioned into two regions that straddle either side of the 180° meridian, wherein the dimensions of a first of the partitioned regions are as follows:

$$Err_{lonmin1} = -180°$$

$$Err_{lonmax1} = Err_{lonmax} \quad (25)$$

and wherein the dimensions of a second of the partitioned regions are as follows:

$$Err_{lonmin2} = +360° + Err_{lonmin}$$

$$Err_{lonmax2} = 180° \quad (26)$$

If the inequality of Eq. 24 is not satisfied, then control proceeds to the block 270 where the processor 40 determines whether the error region crosses the 180° meridian by testing the following inequality:

$$(Err_{lonmin} > -180°) \text{ AND } (Err_{lonmax} > +180°) \quad (27)$$

If the inequality of Eq. 27 is satisfied thereby indicating that the rectangular region spans the 180° meridian, then, at the block 275, the error region is partitioned into two error regions that straddle the 180° meridian wherein the dimensions of a first of the partitioned regions are as follows:

$$Err_{lonmin1} = Err_{lonmin}$$

$$Err_{lonmax1} = 180°; \quad (28)$$

and wherein the dimensions of a second of the two partitions are as follows:

$$Err_{lonmin2} = (-180°)$$

$$Err_{lonmax2} = -360° + Err_{lonmax}. \quad (29)$$

If neither of the inequalities of Eqs. 24 and 27 are satisfied, then control instead proceeds to a block 280 where the processor 40 again determines whether the error region spans the 180° meridian by testing the following inequality:

$$(Err_{lonmin} < -180°) \text{ AND } (Err_{lomax} > 180°) \quad (30)$$

If the inequality of Eq. 30 is satisfied, then control proceeds to a block 285 where the processor 40 redefines the longitudinal range of the error region as follows:

$$Err_{lonmin} = -180° \quad (31)$$

$$Err_{lonmax} = +180° \quad (32)$$

If the inequality of Eq. 30 is not satisfied, then the longitudinal range of the error region 64 need not be redefined and control proceeds to a block 300. Control also proceeds to the block 300 from the blocks 265, 275 and 285 where the longitudinal range of the error region was redefined, if necessary.

At the block 300 the processor 40 identifies the grid squares that are intersected by the error region by identifying the tiling grid columns that correspond to the longitudinal boundaries of the error region and the tiling grid rows that correspond to the latitudinal boundaries of the error region. For example, $Err_{lonmin}$ may be equal to n+1 whereas $Err_{lonmax}$ may be equal to, for example, n+10 and $Err_{latmin}$ may be equal to m+2, etc.

Next, control proceeds to a block 310 where the earth station processor 40 uses the lookup table 60 created in the pre-call processing portion of the method of the present invention to identify the tiles 56 that intersect the grid squares identified at the block 300. In particular, the processor 40 accesses the lookup table locations corresponding to the identified grid squares to obtain the stored addresses. After obtaining the stored addresses, the processor 40 accesses the stored addresses to obtain a list of tiles that intersect the range of grid squares identified at the block 300. The list of tiles becomes the list of candidate tiles, $T_{in}$.

Next, at a block 320, the earth station processor 40 determines whether all of the tiles of $T_{in}$ are associated with the same service area 36. Recall that the processor 40 has previously been programmed with the service areas 36 and the tiles 56 corresponding to each. If all of the tiles 56 correspond to the same service area 36, thereby indicating that the subscriber unit 24 is located within this corresponding service area, then control proceeds to a block 330 where the earth station processor 40 provides the ID for this service area to the MSC 44. Thereafter, the MSC 44 processes the call in accordance with the services pre-programmed for that service area ID. Once the proper service area has been identified and provided to the MSC 44 for call processing, the program terminates at a block 880 (see FIG. 16).

Figure 10:
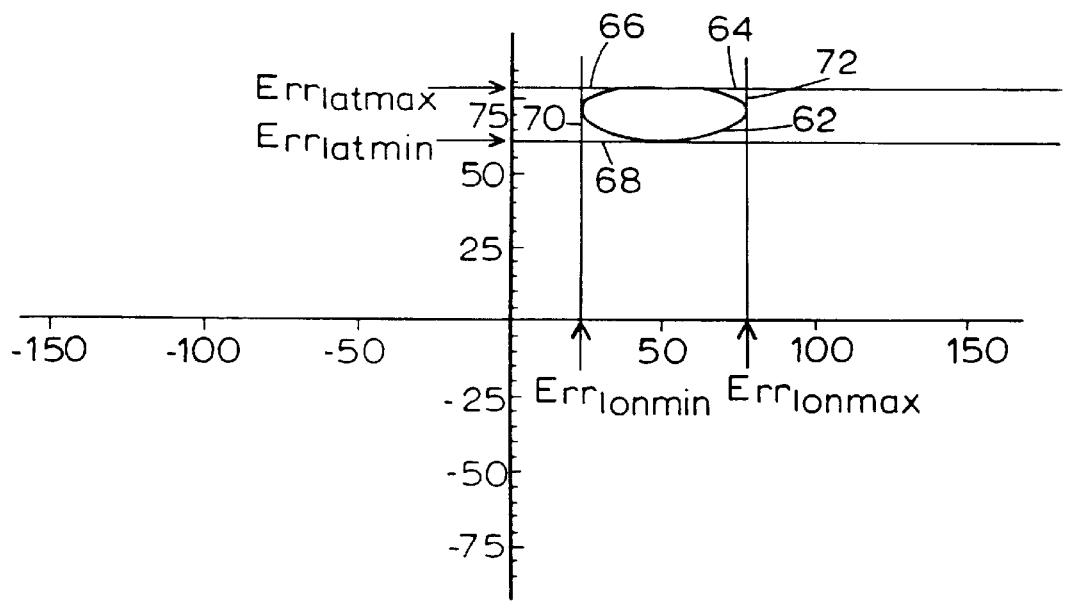
FIG. 10 illustrates the elliptical shape that the circular error region obtains when mapped to the two-dimensional grid used with the method of the present invention, along with the rectangular shape used to approximate the elliptical error region.
Figure 12A:
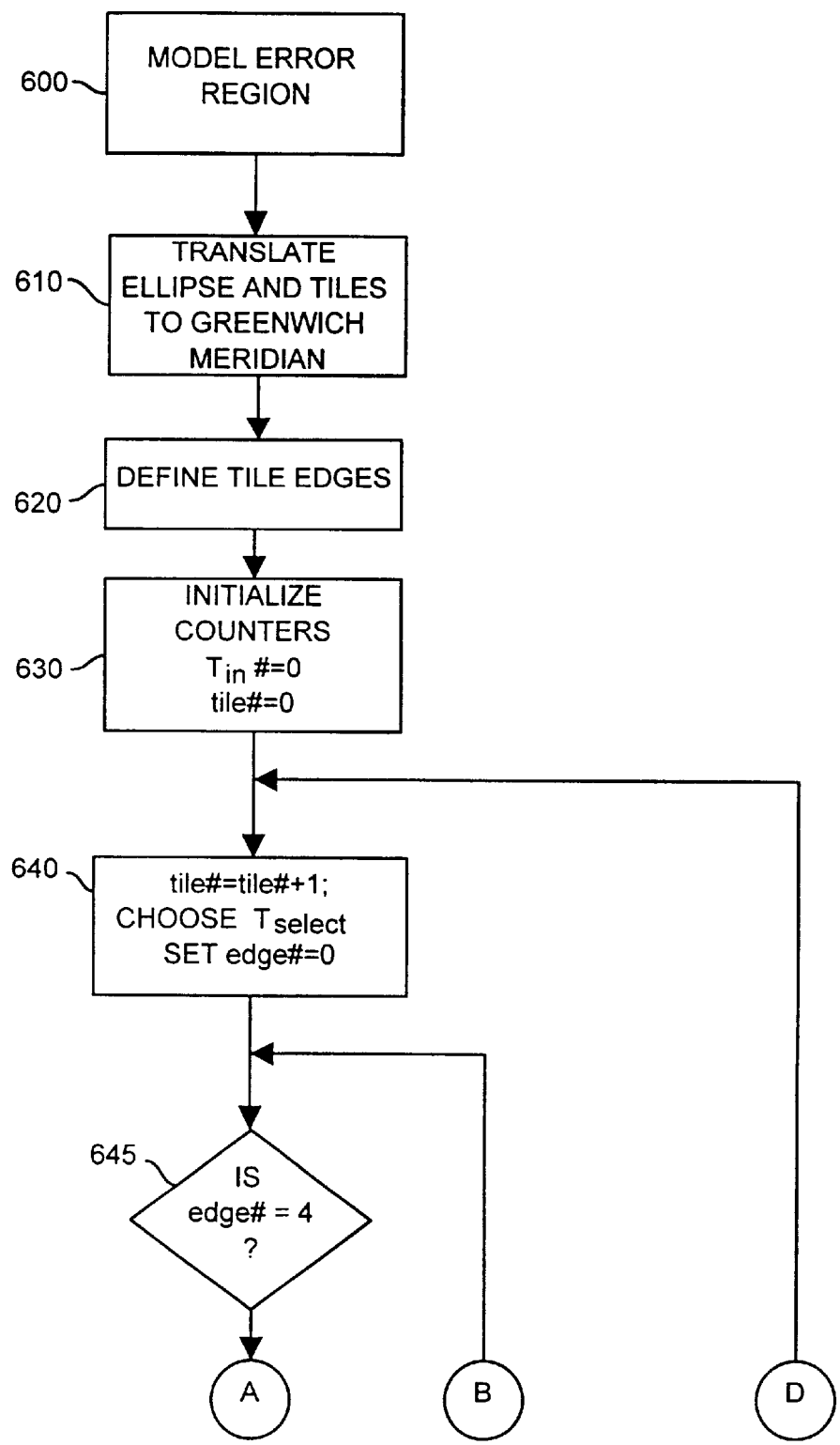
FIGS. 12A and 12B are a flow chart of a segment of the call-processing portion of the method of the present invention that includes the steps taken to perform a point in polygon inclusion method.
Figure 12B:
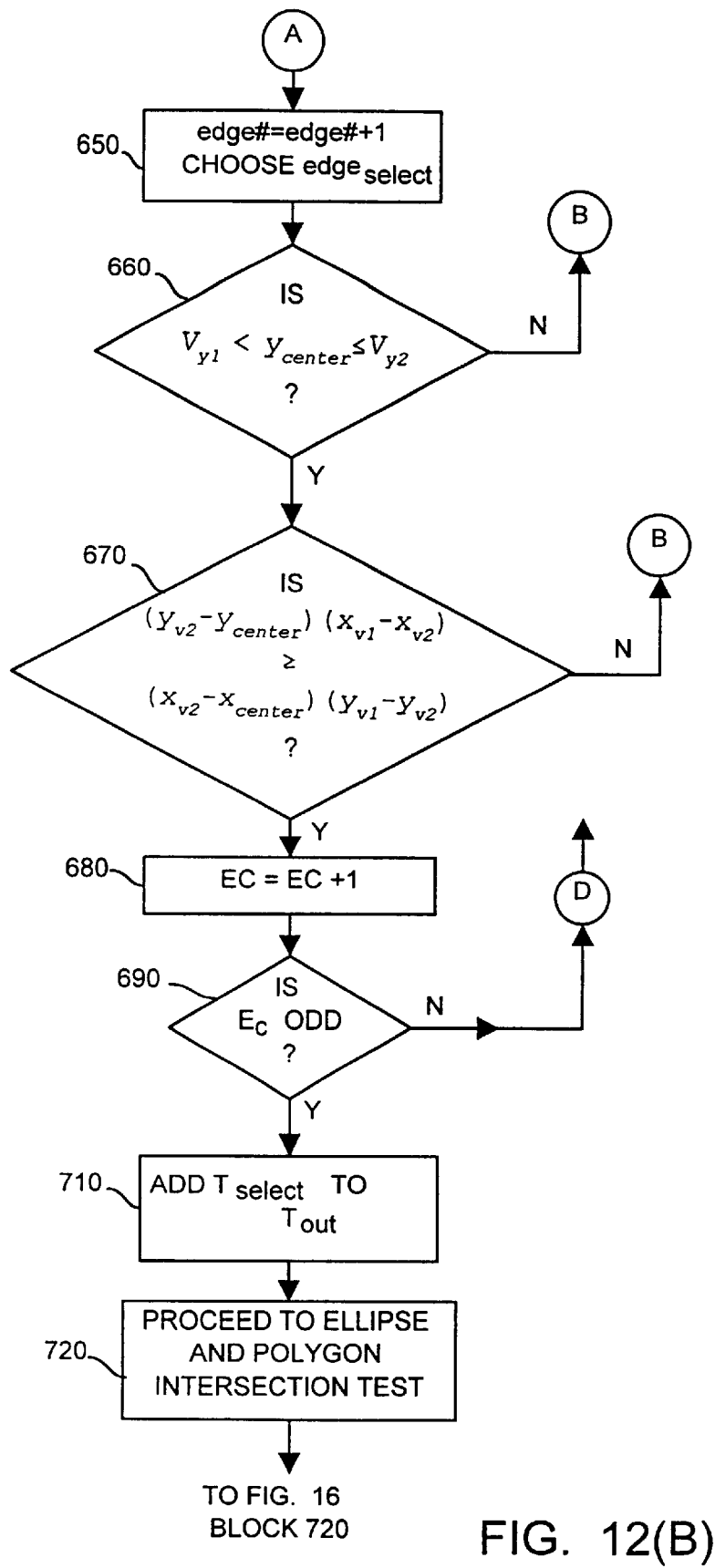

Referring now to FIGS. 10 and 12A–12B, if instead, the tiles do not all correspond to the same service area, then control proceeds to a block 600 where the processor 40 more closely approximates the error region 64 by using the dimensions of the approximating rectangular region to define an elliptical error region. Thereafter, the earth station processor 40 determines which of the candidate tiles listed in $T_{in}$ intersect the elliptical error region as will be described more fully hereinbelow.

To effect rapid identification of the intersecting tiles, the identification process is performed using a point in polygon inclusion test and an ellipse and polygon intersection test. The point in polygon inclusion test is executed via a set of blocks 620–710 at which the processor 40 examines each of the tiles of $T_{in}$ to identify the tile within which the estimated position of the subscriber unit 24 is located. Because the estimated position of the subscriber unit 24 is located at the center of the ellipse, the tile containing the estimated position of the subscriber unit 24 must either partially intersect the ellipse or lie entirely within the boundaries of the ellipse.

After the tile within which the estimated position of the subscriber unit 24 is located has been identified, it is included in a list of tiles denoted $T_{out}$. The tiles remaining in $T_{in}$ are then subjected to the ellipse and polygon intersection test that is executed at a set of blocks 720–870 where the processor 40 separately compares the edges of each of the tiles listed in $T_{in}$ to the boundaries of the ellipse to identify the tiles that intersect the ellipse 62. Each intersecting tile is then added to the list of tiles, $T_{out}$. Thus, after the steps of blocks 620–710 and 720–870 have been executed, the list of tiles, $T_{out}$ includes the tile within which the estimated position of the subscriber unit 24 is located and the tiles that intersect the ellipse 62. Prior to executing the point in polygon inclusion method, at a block 600 the error region is modeled as an ellipse. In the first step of modeling the ellipse 62, the variables used to denote the position of the subscriber unit, $UT_{lon}$, $UT_{lat}$ are reassigned as follows:

$$x_{center} = UT_{lon} \tag{33}$$

$$y_{center} = UT_{lat} \tag{34}$$

Thereafter, the error region is modeled as an ellipse on the same Euclidean plane on which the grid and tiles are mapped. The ellipse is centered at $x_{center}$, $y_{center}$ as follows:

$$x(t) = a \cos(t)$$

$$y(t) = b \sin(t) + UT_{lat}$$

where the semimajor axis, $a = \text{lon}(t_2)$; and the semiminor axis $b = \phi$; and t=any point on the ellipse.

Next, at a block 610 the ellipse is translated to the Greenwich meridian by shifting the center of the ellipse. To effect this shift, the value of $UT_{lon}$ is subtracted from the longitudinal coordinate of the center of the ellipse as follows:

$$x_{center} = x_{center} - UT_{lon} \tag{35}$$

The position of each of the tiles listed in $T_{in}$ is also translated to the Greenwich meridian by subtracting $UT_{lon}$ from each of the vertices, $V_1$ through $V_4$. Note that the vertices are numbered such that physically adjacent vertices are numbered consecutively, i.e., $V_1$ and $V_2$ are adjacent, $V_2$ and $V_3$ are adjacent, $V_3$ and $V_4$ are adjacent and, by default, $V_1$ and $V_4$ are adjacent.

Next, at a block 620, the processor 40 assigns variables to represent each edge of the selected tiles as follows:

edge$_{1,2}$ edge$_{2,3}$ edge$_{3,4}$ edge$_{4,1}$

The subscript used in each of the variables that represent the edges denotes the vertices that border that edge, e.g., edge$_{1,2}$ is located between the vertices $V_1$ and $V_2$.

Figure 13:
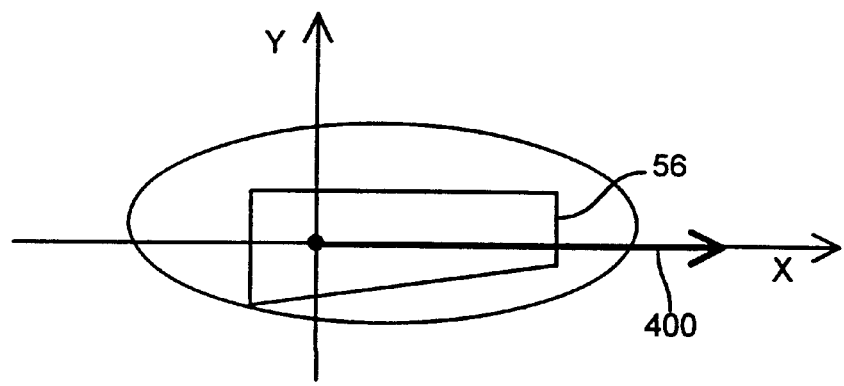
FIG. 13 illustrates a ray that originates at the position of the subscriber unit and that extends in the positive x direction.

After the ellipse 62 has been modeled and the tile edges have been defined, a set of steps represented by the blocks 630–700 are used to execute the point in polygon inclusion test. The point in polygon inclusion method is best understood with reference to FIG. 13 which shows one of the tiles 56 located within a Cartesian coordinate system having a horizontal axis x and a vertical axis y wherein the x axis is a measure of longitude in units of degrees and the y axis is a measure of latitude in units of degrees. For purposes of illustration only, the estimated position of the subscriber unit 24, $UT_{lon}$, $UT_{lat}$, i.e., the center of the ellipse, is shown located within the tile 56. To conduct the point in polygon inclusion method, which is a variation on the well known "crossings test," a test ray 400 that originates at $UT_{lon}$, $UT_{lat}$ is shot in the positive x direction as shown in FIG. 13 and then the number of tile edges crossed by the test ray 400 are counted. If the number of tile edges crossed are odd then $UT_{lat}$, $UT_{lon}$ lies within the tile 56. If the number of tile edges crossed are even then the point does not lie in the tile 56.

Referring now to FIGS. 12A–12B, the point in polygon inclusion method used to rapidly identify the tile within which the estimated position of the subscriber unit 24 is located begins at the block 630. At the block 630, the earth station processor 40 sets a variable denoted $T_{in\#}$ equal to the number of candidate tiles listed in $T_{in}$. In addition, the earth station processor 40 initializes a counter denoted tile# by setting it equal to zero.

Next, at a block 640, the earth station processor 40 increments the value of tile# by one as follows: tile#=tile#+1. In addition, the processor 40 selects a tile from $T_{in}$, denoted $T_{select}$, that occupies a position in the list $T_{in}$ corresponding to the value of tile#. For example, if tile#=1, then $T_{select}$ is the first tile listed in $T_{in}$. Lastly, a counter denoted edge# is initialized at zero.

Next, at a block 645, the value of edge# is tested using the following inequality: edge#=4? If the inequality is satisfied, then all four of the edges of $T_{select}$ have been examined and control proceeds to a block 690.

Next, at a block 650, the processor 40 increments the value of edge# by one as follows: edge=edge#+1. In addition, the processor 40 selects an edge of the tile $T_{select}$ corresponding to the value of edge#, i.e., if edge#=1, then the edge selected, denoted edge$_{select}$, is edge$_{1,2}$.

Next, at a block 660, the earth station processor 40 examines the position of the selected edge, edge$_{select}$, of the selected tile, $T_{select}$, relative to the subscriber unit 24. In particular, the processor 40 determines whether the center of the ellipse lies within the interval of y values that correspond to the tile edge$_{1,2}$, i.e., the y coordinates of the vertices of the edge$_{1,2}$, by testing the following inequality:

$$v_{y1} < y_{center} \le v_{y2} \tag{36}$$

where $v_{y1}$=the y coordinate of the first vertex $V_1$, and $v_{y2}$=the y coordinate of the second vertex $V_2$.

If the inequality of Eq. 36 is satisfied, then the subscriber unit 24 is located within the interval of y values defined by edge$_{1,2}$ and control proceeds to a block 670. If, instead, the inequality of Eq. 36 is not satisfied, then the test ray 400 originating at the position of the subscriber unit 24 and moving in a positive x direction does not cross the edge$_{1,2}$. Thus, control loops back to the block 645 and steps subsequent thereto.

At the block 670, the earth station processor 40 tests to determine whether the subscriber unit 24 lies to left or to the right of edge$_{1,2}$ as follows:

$$(y_{v2} - y_{center})(x_{v1} - x_{v2}) \ge (x_{v2} - x_{center})(y_{v1} - y_{v2}) \tag{37}$$

where $x_{v1}$=the x coordinate of the first vertex, $V_1$;

$x_{v2}$=the x coordinate of the second vertex, $V_2$.

If the subscriber unit 24 lies to the left of edge$_{1,2}$, then the test ray 400 originating at the subscriber unit 24 and projected in the direction of the positive x axis must cross the tile edge$_{1,2}$. Thus, if the inequality expressed in Eq. 37 is satisfied then control proceeds to a block 680 where a variable used to denote the number of tile edge crossings, EC, is incremented by one, i.e., EC=EC+1. If the inequality expressed by Eq. 37 is not satisfied, then the subscriber unit 24 does not lie to the left of the edge$_{1,2}$ and the variable EC is not incremented and control instead proceeds directly to the block 690.

At the block 690, the number of edge crossings, EC, is examined. If the number of edge crossings, EC, is odd, then the center of the ellipse $x_{center}$, $y_{center}$ must lie within the tile, $T_{select}$. Thus, control proceeds to a block 710 where $T_{select}$ is added to the list of tiles, $T_{out}$, and is removed from the list of tiles $T_{in}$. In addition, if EC is odd, then the tile within which the subscriber unit 24 is located has been identified such that the point in polygon inclusion method terminates and control continues at a block 720 where the ellipse and polygon intersection test begins using the remaining tile of $T_{in}$.

If EC is an even number, then the ellipse center does not lie within $T_{select}$. At this time, control loops back to the block 640 and steps subsequent thereto where the processor 40 selects the next tile from the list $T_{in}$ for testing relative to the ellipse center.

After the tile within which the estimated position of the subscriber unit 24 is located has been identified, the earth station processor 40 executes the ellipse and polygon intersection test at the blocks 720–845 to determine which of the remaining tiles listed in $T_{in}$ intersect the elliptical error region 62. The identified, intersecting tiles are then listed in $T_{out}$. Because the elliptical error region 62 is smaller in area than the rectangular region 64, it follows that the elliptical error region 62 may intersect fewer tiles than the rectangular region 64 such that $T_{out}$ will include fewer tiles than $T_{in}$. Thus the ellipse and polygon intersection test is used to rapidly narrow the list of potential tiles, $T_{out}$, within which the subscriber unit 24 may be located, thereby minimizing the processing time required to identify the proper service area.

Figure 14:
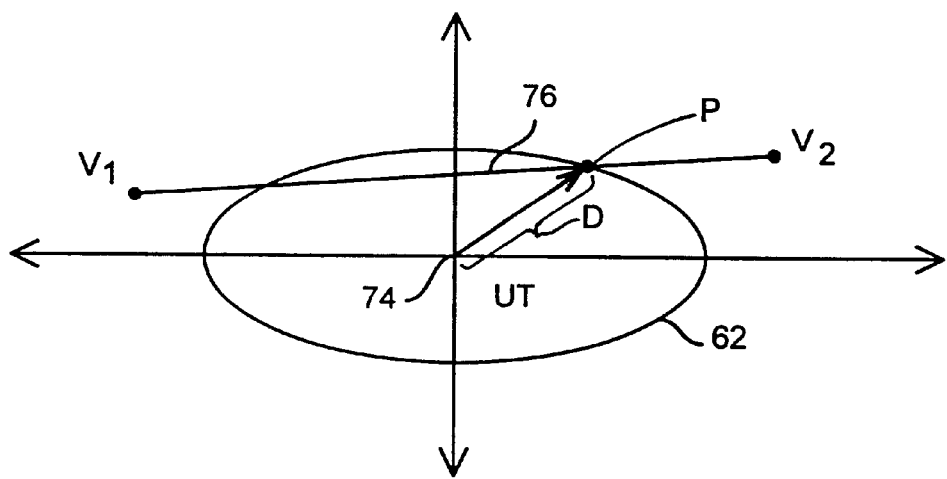
FIG. 14 illustrates an ellipse that is intersected by a tile edge wherein each endpoint of the tile edge lies outside of the ellipse.

The ellipse and polygon intersection test is best understood with reference to FIG. 14 which shows an elliptical error region 62 that is defined by a boundary 58 and has a center 74 wherein the error region boundary is intersected by a tile edge 76. The tile edge 76 is bounded by the vertices, $V_1$ and $V_2$ and a point, P, lies on the tile edge 76 between the vertices $V_1$ and $V_2$.

The ellipse and polygon intersection test follows from the geometrical premise that the distance from the center 74 of the ellipse 62 to the point P is equal to the distance from the center 74 of the ellipse 62 to the boundary of the ellipse 62 in the direction of the point P if and only if the point P lies on the boundary of the ellipse 62. It further follows that if the point P lies on the boundary of the ellipse 62, then the tile edge 62 intersects the ellipse 62. Using this premise, the distance, D, from the center 74 of the ellipse 62 to the point P, wherein the point P is located on the tile edge 76 and is also located on the boundary of the ellipse 62, may be calculated using two different geometrical methods. A first of the two methods involves using the equation of an ellipse and a second of the two methods involves using the Cartesian coordinates of the point, P, to determine the magnitude of the length of the vector that originates at the center 74 of the ellipse 62 and extends to the point, P. Both the first and second methods for calculating this distance, D, result in two different quadratic expressions that are thereafter used to obtain a third quadratic expression. If there exists a real (versus imaginary) solution to this third quadratic expression and the solution is a value between 0 and 1, then the edge intersects the ellipse boundary.

Note that the solution must be a real value between 0 and 1 because, as described with reference to the block 110 shown in FIG. 4, the tile edge 76 has been previously defined such that for any point P on the edge there exists a value for t between the interval 0 and 1, t∈[0,1].

Figure 15:
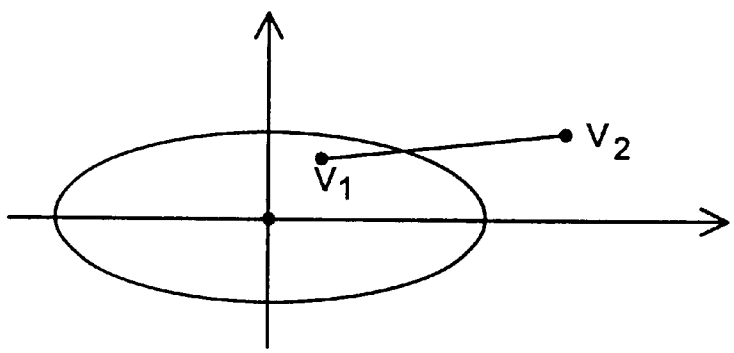
FIG. 15 illustrates an ellipse that is intersected by a tile edge wherein one endpoint of the tile edge lies outside of the boundary of the ellipse and one endpoint lies inside of the boundary of the ellipse.

As shown in FIGS. 14 and 15, the tile edge 76 may intersect the ellipse 62 when the edge 76 is positioned such that neither of the vertices $V_1$ nor $V_2$ lies within the boundaries of the ellipse 62, or a tile edge 76 may intersect the ellipse 62 such that one of the vertices, e.g., $V_1$, of the edge lies within the ellipse 62 as shown in FIG. 15.

Figure 16:
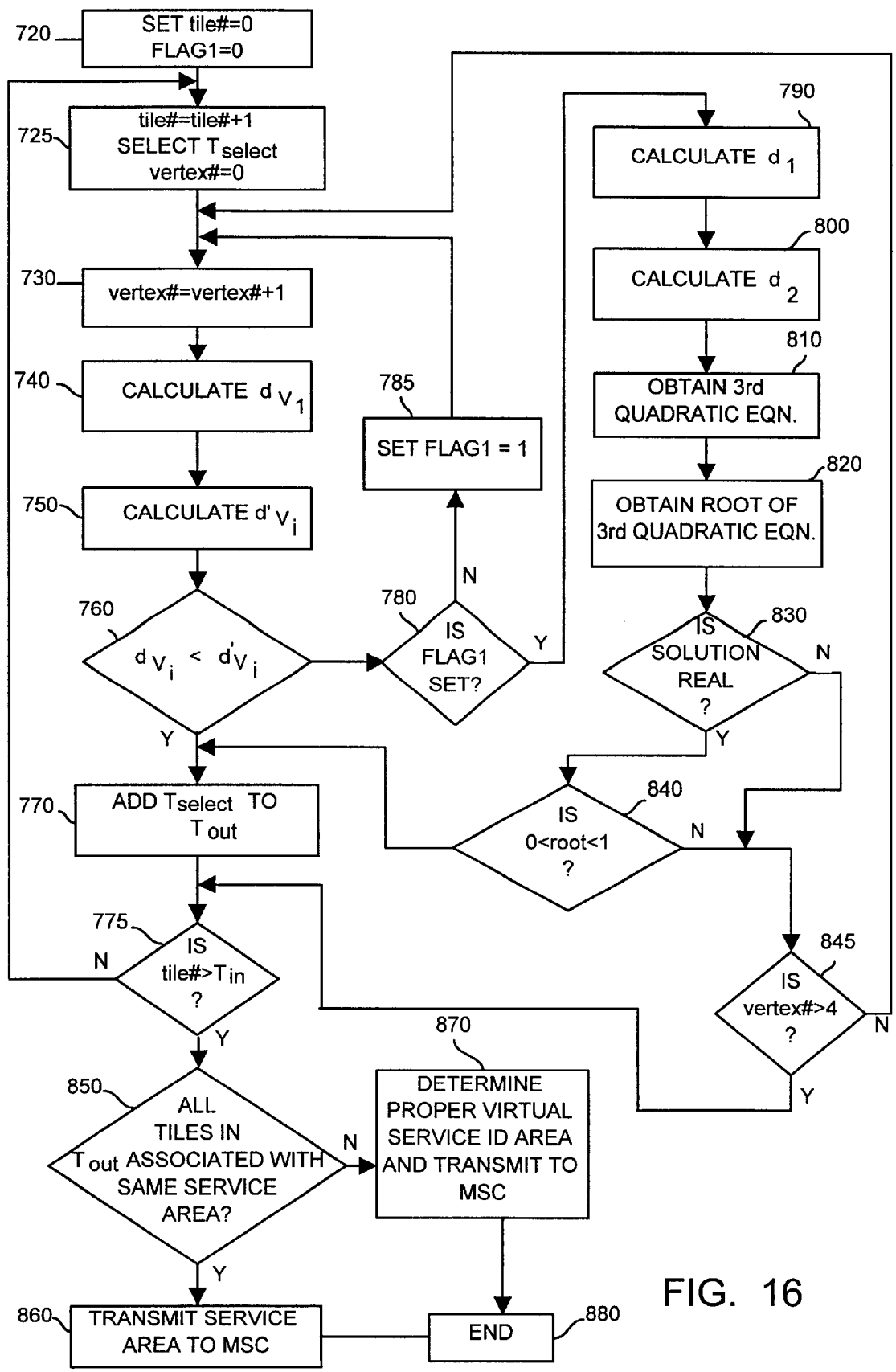
FIG. 16 is a flow chart showing the final steps of the call-processing portion of the method of the present invention and illustrates the steps taken to preform an ellipse and polygon intersection test.

Referring now to FIG. 16, the ellipse and polygon intersection test begins at the block 720 where the processor 40 resets the value of the counter tile# to zero and clears a flag denoted FLAG1 such that FLAG1=0. Next, at a block 725, the processor 40 increments the value of tile# i.e., tile#= tile#+1. The processor 40 also selects the tile, $T_{select}$, from $T_{in}$ that occupies the position in the list $T_{in}$ corresponding to the value of tile#, e.g., if tile#=1, then the first tile listed in $T_{in}$ is selected. (Of course, it is assumed, that the list of tiles $T_{in}$ has been reordered following the removal from $T_{in}$ of the tile identified in the point in polygon inclusion method executed at the blocks 620–710.) Lastly, at the block 725 the earth station processor 40 initializes the counter vertex# as follows: vertex#=0. Next, at a block 730, the processor increments the value of the counter vertex# by one to obtain vertex#=vertex#+1.

Control then proceeds to a set of blocks 740–760, where the earth station processor 40 tests to determine whether the edge$_{1,2}$ is situated relative to the ellipse 62 such that either of the vertices, $V_1$ or $V_2$, associated with the edge$_{1,2}$ lies within the boundary of the translated ellipse 62. This testing begins at the block 740 where the earth station processor 40 calculates the square of the Euclidean distance, $d_{v_i}$, from the center 74 of the ellipse 62 to the vertex, $V_1$ as follows:

$$d_{v_i} = V_{x_i}^2 + V_{y_i}^2 \tag{38}$$

Then, at a block 750, the processor 40 calculates the distance, $d'_{v_i}$, between the center 74 of the translated ellipse 62 and the boundary of the ellipse 62 in the direction of the vertex, $V_1$, using the standard equation of an ellipse as follows:

$$d_{v_i}' = a^2 \cos(\theta_{v_i}) + b^2 \sin^2(\theta_{v_i});$$

where $$\theta_{v_i} = \arctan 2(V_{x_i}, V_{y_i}). \tag{39}$$

After the values $d_{v_i}$ and $d'_{v_i}$ have been calculated, at a block 760, the processor 40 tests the following inequality to determine whether the vertex, $V_1$, lies in the ellipse as follows:

$$d_{v_i} \leq d'_{v_i} \tag{40}$$

If the inequality expressed in Eq. 41 is satisfied, then the vertex, $V_1$, lies within the boundary of the ellipse 62 such that the ellipse 62 and the edge$_{1,2}$ must intersect. As a result, control branches to a block 770 where the processor 40 adds the tile $T_{select}$ to the list of tiles, $T_{out}$. Thereafter, control proceeds to the 775 where the processor 40 determines whether the last tile in the list of tiles, $T_{in}$ has been examined by testing the following equation:

$$\text{tile}\# = T_{in}$$

If the equality is not satisfied then control loops back to the block 725 and blocks subsequent thereto for testing of additional tiles as described hereinbefore.

If the inequality tested at the block 760 is not satisfied, thereby indicating that the first vertex associated with the tile edge does not lie within the boundary of the ellipse, then the processor 40 tests to determine whether the second vertex associated with the edge being examined lies within the ellipse. A flag, FLAG1 is used to indicate whether the vertex being tested is the first associated with the tile edge or the second. In particular, after block 760 control proceeds to a block 780 where the processor 40 tests to determine whether the FLAG1 is set. If FLAG1 is not set, then both vertices of the edge have not been examined and control loops back to the block 730 and blocks subsequent thereto as described hereinbefore. However, prior to looping back to the block 730 control passes through a block 785 where the processor 40 sets the flag, FLAG1, thereby to indicate that the second vertex associated with the tile edge is being examined.

If, instead, the FLAG1 is set, then both of the vertices associated with the tile edge have been tested via the point in polygon inclusion test. Next control proceeds to the blocks 790–840 where the earth station processor 40 continues the ellipse and polygon intersection test to determine whether the edge being examined intersects the ellipse 62.

The set of steps represented at the blocks 790–840 are premised on the assumption that the point P lies on the boundary of the ellipse 62 and on the $\text{edge}_{1,2}$ such that the tile $T_{select}$ intersects the ellipse 62. The distance, D, between the center 74 of the ellipse 62 and the point, P, is calculated using two geometrically different methods. Each of the two methods results in a different quadratic expression, both of which are thereafter used to obtain a third quadratic expression. If the root of the third quadratic expression has a real solution that is between the interval [0,1], then the point, P, that lies on the $\text{edge}_{1,2}$ and the ellipse boundary intersect.

Referring still to FIG. 16, the set of steps used to calculate the distance, D, using a first of the two methods begins at the block 790 where the processor 40 calculates a distance, denoted $d_1$, between any point, denoted $P_t$, lying on the $\text{edge}_{12}$, and the center 74 of the ellipse 62. The distance, $d_1$ is calculated by normalizing the vector that originates at the center 74 of the ellipse 62 and that extends to any point $P_t$ on the $\text{edge}_{1,2}$ as follows:

$$d_1^2 = |P_t^2| \quad (42)$$
$$= (P_1 + t(P_2 - P_1)) \cdot (P_1 + t(P_2 - P_1))$$
$$= (P_2 - P_1) \cdot (P_2 - P_1)t^2 + 2P_1 \cdot (P_2 - P_1)t + (P_1 \cdot P_1)$$
$$= a_1 t^2 + b_1 t + c_1$$

where $a_1, b_1$ and $c_1$ represent the coefficients of the quadratic equation in descending order. Again, recall that the $\text{edge}_{1,2}$ is defined such that any point, $P_t$ lying on the $\text{edge}_{1,2}$ is represented by $P_t = P_1 + t(P_1 - P_2)$ for $t \in [\mathbf{0,1}]$.

Next control proceeds to a block 800, where the processor 40 determines a distance, $d_2$, between the center 74 of the ellipse 62 and the ellipse boundary at the point $P_t$.

To obtain $d_2$ the distance between the point $P_t$ and the origin of the system is expressed as follows:

$$d_2^2 = x_t^2 + y_t^2 \quad (43)$$

where $$(x_t, y_t) = P_t = (x_1 + t(x_2 - x_1), y_1 + t(y_2 - y_1)) \quad (44)$$

Next, the equation for a standard ellipse is expressed as follows:

$$\frac{x^2}{a^2} + \frac{y^2}{b^2} = 1. \quad (45)$$

where
a=the semimajor axis of the ellipse and
b=the semiminor axis of the ellipse.
Solving Eq. 45 for y results in the following:

$$y = \pm b \sqrt{1 - \frac{x^2}{a^2}} \quad (46)$$

Substituting the value of y obtained in Eq. 46 into Eq. 43 and rearranging, the distance, $d_2$, is expressed as follows:

$$d_2^2 = x_t^2 \left(1 - \frac{b^2}{a^2}\right) + b^2 \quad (47)$$

Finally, $x_t$ as represented in Eq. 44 is substituted into Eq. 47 to obtain $d_2$ as follows:

$$d_2^2 = x_t^2 \left(1 - \frac{b^2}{a^2}\right) + b^2 \quad (48)$$
$$= (x_1 + t(x_2 - x_1))^2 \left(1 - \frac{b^2}{a^2}\right) + b^2$$
$$= ((x_2 - x_1)^2 t^2 + 2x_1(x_2 - x_1)t + x_1^2)\left(1 - \frac{b^2}{a^2}\right) + b^2$$
$$= (x_2 - x_1)^2 \left(1 - \frac{b^2}{a^2}\right)t^2 + 2x_1(x_2 - x_1)\left(1 - \frac{b^2}{a^2}\right)t +$$
$$x_1^2 \left(1 - \frac{b^2}{a^2}\right) + b^2$$
$$= a_2 t^2 + b_2 t + c_2$$

where $$a_2 = (x_2 - x_1)^2 \left(1 - \frac{b^2}{a^2}\right)$$

$$b_2 = 2x_1(x_2 - x_1)\left(1 - \frac{b^2}{a^2}\right)$$

$$c_2 = x_1^2 \left(1 - \frac{b^2}{a^2}\right) + b^2$$

Thus, the distance, between the center 74 of the ellipse 62 and any point $P_t$ is represented by $d_1$ and $d_2$ according to Eqs. 43 and 49. As the value for t increases from 0 to 1, the point $P_t$ on the line segment $P_1$, $P_2$ travels from $P_1$ to $P_2$. Thus, if the point P lies on the boundary of the ellipse 62, the Eqs. 42 and 48 representing distances $d_1$ and $d_2$ will be equal such that a common, real solution will exist for Eqs. 43 and 49.

To determine whether such a common solution exists, at a block 810, Eq. 49 is subtracted from Eq. 43 to obtain a third quadratic equation as follows:

$$\begin{array}{r}a_1x^2 - b_1x - c_1 \\ -a_2x^2 - b_2x - c_2 \\ \hline a_3x^2 - b_3x - c_3\end{array} \quad (49)$$

where $a_3 = a_1 - a_2$
$b_3 = b_1 - b_2$
$c_3 = c_1 - c_2$

Next, at a block 820 the root of the third quadratic equation (Eq. 50) is obtained as follows:

$$x = \frac{-b \pm \sqrt{b_3^2 - 4a_3c_3}}{2a} \quad (50)$$

Lastly, at a block 830, the processor 40 tests to determine whether the discriminant of the root in Eq. 50 is greater than zero, i.e., a real versus imaginary solution, by testing the following inequality:

$$b_3^2 - 4a_3c_3 \geq 0 \quad (51)$$

If the inequality of Eq. 52 is satisfied, then a real solution exists for Eq. 51, thereby indicating that the translated ellipse 62 and the line defined by the edge$_{12}$ intersect and control proceeds to a block 840.

If, instead, the inequality of Eq. 52 is not satisfied, then the edge$_{12}$ and the translated ellipse do not intersect and control instead proceeds to a block where the earth station processor 40 tests to determine whether the fourth vertex associated with the tile has been examined such that the counter vertex#=4.

If the counter vertex# does not equal four, then control proceeds to the block 730 and blocks subsequent thereto as described hereinbefore.

If the counter vertex# does equal four, then all vertices associated with the tile being examined have been tested and control proceeds to the block 775 and the blocks subsequent thereto.

At the block 840, the processor 40 determines whether the translated ellipse 62 and the edge$_{12}$ intersect by testing to determine whether the root of the quadratic equation is a value between 0 and 1 as follows:

$$0 < \left[\frac{-b_3 \pm \sqrt{b_3^2 - 4a_3c_3}}{2a_3}\right] < 1 \quad (52)$$

If the inequality of Eq. 53 is satisfied, then the edge$_{12}$ and the ellipse 62 intersect and control proceeds to the block 770 where the earth station processor 40 adds the intersecting tile to the list, T$_{out}$, as described hereinbefore.

If the inequality of Eq. 53 is not satisfied, then the edge of the tile and the ellipse 62 do not intersect and control instead proceeds to the block 845 and blocks subsequent thereto as described hereinbefore.

Referring again to the block 775 where the processor 40 tests to determine whether all of the tiles listed in T$_{in}$ have been examined, if the value of the counter, tile#, exceeds or is equal to the number of values in the list T$_{in}$, thereby indicating that every tile included in T$_{in}$ has been checked for intersection with the ellipse 62, then control proceeds to a block 850.

At the block 850 the processor 40 obtains the service area associated with each of the tiles listed in T$_{out}$. If all of the tiles listed in T$_{out}$ are associated with the same service area, then control proceeds to a block 860 where the processor 40 obtains the ID for the service area and transmits the ID to the MSC 44.

If, instead, the tiles of T$_{out}$ are not associated with the same service area, then control proceeds to a block 870 where the earth station processor determines an appropriate pre-programmed virtual service area to be used to process the call. The ID associated with the identified virtual service area is then forwarded to the MSC 44 for call processing at the block 870. The MSC 44 responds to the service area ID or virtual service area ID supplied by the earth station processor 40 by enabling or disabling the services or billing rates that have been pre-programmed steps for the service area ID.

Once the appropriate service area ID has been forwarded to the MSC 44, the method of the present invention terminates at a block 880.

The method of the present invention may instead utilize any number of standard, well known point in polygon inclusion and polygon ellipse intersection algorithms to determine whether the subscriber unit 24 is located within a tile or an elliptical error region. In addition, the method of the present invention may instead have multiple methods for detecting the amount of error inherent in the subscriber unit's 24 position, for example, rather than modeling such error with a circular error region, the error may be known to a greater degree of accuracy and therefore may instead be modeled using a smaller rectangular region.

Moreover, the method of the present invention, although described in the context of mobile satellite communications systems may alternatively be applied in other applications where it is desirable to provide a service based upon the geographical region within which a user is located. Alternatively, the pre-call processing portion of the method of the present invention, which presents an earth mapping system, may be used to create a map of a geographical region that provides desired information about a geographical region. In particular, any information related to the characteristics of a geographical region may be conveyed by partitioning the geographical region into tiles wherein each tile represents a portion of the geographic region having a characteristic associated with the tile.

While the present invention has therefore been described with reference to specific examples, which are intended to be illustrative only, and not to be limiting of the invention, it will be apparent to those of ordinary skill in the art that changes, additions, and/or deletions may be made to the disclosed embodiments without departing from the spirit and scope of the invention.

What is claimed is:

1. A method for determining a geographical region within which a target is located, the target being positioned at a target location, using a map of a plurality of geographical regions on the surface of the earth, wherein an estimate of the target location has been previously determined, and wherein the estimate of the target location comprises a region of error, the method comprising the steps of:

determining at least one target grid square, wherein at least a portion of the error region is intersected by the at least one target grid square;

identifying a first set of tiles that intersect the at least one target grid square;

identifying a first set of the geographical regions, the first set of geographical regions comprising the geographical regions that are associated with the tiles in the first set of tiles;

wherein a south polar tile comprises a geographical region that is centered at the south pole and that is bounded by a first line of latitude and wherein a north polar tile comprises a geographical region that is centered at the north pole and that is bounded by a second line of latitude, and further wherein the error region is bounded by an upper boundary and a lower boundary;

comparing the upper boundary of the error region to the second line of latitude; and comparing the lower boundary of the error region to the first line of latitude; and if the upper boundary is positioned at or above the second line of latitude, then adding the north polar tile to the first set of tiles; and if the lower boundary is positioned at or below the first line of latitude, then adding the south polar tile to the first set of tiles.

* * * * *